United States Patent
Sykes et al.

(10) Patent No.: US 12,263,596 B2
(45) Date of Patent: *Apr. 1, 2025

(54) AUTONOMOUS AND SEMI-AUTONOMOUS CONTROL OF AERIAL ROBOTIC SYSTEMS

(71) Applicant: Altec Industries, Inc., Birmingham, AL (US)

(72) Inventors: Jonathan Westin Sykes, Gower, MO (US); Timothy J. Mourlam, Shawnee, KS (US); David Lindquist, Cameron, MO (US); William Naber, Saint Joseph, MO (US); Robert Nichols, Saint Joseph, MO (US)

(73) Assignee: Altec Industries, Inc., Birmingham, AL (US)

( * ) Notice: Subject to any disclaimer, the term of this patent is extended or adjusted under 35 U.S.C. 154(b) by 59 days.

This patent is subject to a terminal disclaimer.

(21) Appl. No.: 18/135,941

(22) Filed: Apr. 18, 2023

(65) Prior Publication Data

US 2024/0033916 A1  Feb. 1, 2024

Related U.S. Application Data

(63) Continuation of application No. 17/875,710, filed on Jul. 28, 2022, now Pat. No. 11,660,750.

(51) Int. Cl.
*B25J 9/16* (2006.01)

(52) U.S. Cl.
CPC ............. *B25J 9/1664* (2013.01); *B25J 9/161* (2013.01); *B25J 9/163* (2013.01)

(58) Field of Classification Search
None
See application file for complete search history.

(56) References Cited

U.S. PATENT DOCUMENTS

| | | | |
|---|---|---|---|
| 1,050,004 | A | 1/1913 | Cronin |
| 1,676,584 | A | 7/1928 | Tideman |
| 1,966,989 | A | 7/1934 | Bernard |

(Continued)

FOREIGN PATENT DOCUMENTS

| | | |
|---|---|---|
| CN | 108789416 A | 11/2018 |
| CN | 113902990 A | 1/2022 |

(Continued)

OTHER PUBLICATIONS

U.S. Appl. No. 17/875,674, filed Jul. 28, 2022, Jonathan Westin Sykes.

(Continued)

*Primary Examiner* — Ryan Rink
(74) *Attorney, Agent, or Firm* — Erise IP, P.A.

(57) ABSTRACT

Systems and methods for performing a task in an operation environment of an aerial device with an autonomous or semi-autonomous robot are described. In some embodiments, a robot is disposed at an end of a boom of an aerial device. The robot may comprise cameras, actuators, sensors, processors, and manipulators that work together to perform tasks fully autonomously or semi-autonomously. Furthermore, the robot may comprise tools for performing the tasks and computer-executable instructions for performing the tasks may be based on the various sensory inputs, the tools, and the tasks to be performed.

20 Claims, 12 Drawing Sheets

(56) References Cited

U.S. PATENT DOCUMENTS

| | | | |
|---|---|---|---|
| 2,662,730 A | 12/1953 | Crawford | |
| 2,786,092 A | 3/1957 | Gage | |
| 4,937,759 A * | 6/1990 | Vold | G05B 19/4061 |
| | | | 700/262 |
| 5,076,449 A | 12/1991 | Clutter | |
| 5,105,367 A | 4/1992 | Tsuchihashi et al. | |
| 5,215,202 A | 6/1993 | Fujimoto | |
| 5,286,159 A | 2/1994 | Honma | |
| 5,640,876 A | 6/1997 | Erwin | |
| 5,782,440 A | 7/1998 | Ozga et al. | |
| 6,527,405 B2 | 3/2003 | Hsieh | |
| 9,203,219 B2 | 12/2015 | Devine et al. | |
| 9,707,680 B1 | 7/2017 | Jules et al. | |
| 9,727,053 B2 | 8/2017 | Ito | |
| 10,105,853 B1 | 10/2018 | Hwang et al. | |
| 10,589,433 B2 | 3/2020 | Nahwi et al. | |
| 10,626,632 B2 | 4/2020 | Sauber et al. | |
| 11,660,750 B1 | 5/2023 | Sykes et al. | |
| 11,689,008 B1 | 6/2023 | Nichols et al. | |
| 11,697,209 B1 | 7/2023 | Mourlam et al. | |
| 11,717,969 B1 | 8/2023 | Mourlam | |
| 11,742,108 B1 | 8/2023 | Naber et al. | |
| 11,749,978 B1 | 9/2023 | Lindquist et al. | |
| 11,794,359 B1 | 10/2023 | Sykes et al. | |
| 2001/0055525 A1 | 12/2001 | Inokuchi et al. | |
| 2002/0179559 A1 | 12/2002 | Hashiguchi et al. | |
| 2003/0029215 A1 | 2/2003 | Latour | |
| 2003/0174286 A1 | 9/2003 | Trumbull | |
| 2004/0112207 A1 | 6/2004 | Price | |
| 2004/0182235 A1 | 12/2004 | Hart | |
| 2006/0045294 A1 | 3/2006 | Smyth | |
| 2007/0124024 A1 | 5/2007 | Okamoto et al. | |
| 2007/0192910 A1 | 8/2007 | Vu et al. | |
| 2007/0291128 A1 | 12/2007 | Wang et al. | |
| 2008/0188986 A1* | 8/2008 | Hoppe | B25J 9/1692 |
| | | | 901/41 |
| 2009/0088773 A1 | 4/2009 | Zhao et al. | |
| 2009/0088897 A1 | 4/2009 | Zhao et al. | |
| 2011/0036605 A1 | 2/2011 | Leong et al. | |
| 2011/0245844 A1 | 10/2011 | Jinno | |
| 2013/0011220 A1 | 1/2013 | Jacobsen et al. | |
| 2013/0014852 A1 | 1/2013 | Hayden et al. | |
| 2013/0313042 A1 | 11/2013 | Freeman et al. | |
| 2014/0014637 A1 | 1/2014 | Hunt | |
| 2014/0094968 A1* | 4/2014 | Taylor | B25J 13/006 |
| | | | 700/257 |
| 2015/0015708 A1 | 1/2015 | Collett et al. | |
| 2015/0044009 A1 | 2/2015 | Yang et al. | |
| 2016/0239080 A1 | 8/2016 | Marcolina et al. | |
| 2017/0289445 A1 | 10/2017 | Kumar et al. | |
| 2017/0340969 A1 | 11/2017 | Lim et al. | |
| 2018/0011681 A1 | 1/2018 | Kada et al. | |
| 2018/0243921 A1 | 8/2018 | Hashimoto et al. | |
| 2019/0125462 A1* | 5/2019 | Peine | A61B 34/74 |
| 2019/0176334 A1 | 6/2019 | Zhou et al. | |
| 2019/0201136 A1 | 7/2019 | Shelton, IV et al. | |
| 2019/0222004 A1 | 7/2019 | Turnbull | |
| 2019/0256335 A1 | 8/2019 | Araki | |
| 2019/0257097 A1 | 8/2019 | Kawai et al. | |
| 2020/0122321 A1 | 4/2020 | Khansari Zadeh et al. | |
| 2021/0001483 A1 | 1/2021 | Milenkovic | |
| 2021/0020337 A1 | 1/2021 | Ciapala et al. | |
| 2021/0106342 A1 | 4/2021 | Blackwell | |
| 2021/0252714 A1 | 8/2021 | Hayashi et al. | |
| 2021/0269291 A1 | 9/2021 | Callaghan et al. | |
| 2021/0273424 A1 | 9/2021 | Harvey et al. | |
| 2021/0282871 A1 | 9/2021 | Prior et al. | |
| 2021/0305790 A1 | 9/2021 | O'Connell et al. | |
| 2021/0315590 A1 | 10/2021 | Chappuis et al. | |
| 2021/0370509 A1 | 12/2021 | Pivac | |
| 2022/0032476 A1 | 2/2022 | Robertson | |
| 2022/0138612 A1 | 5/2022 | Vengertsev et al. | |
| 2022/0203562 A1 | 6/2022 | Brown et al. | |
| 2022/0212340 A1 | 7/2022 | Hasegawa et al. | |
| 2022/0241975 A1 | 8/2022 | Tan et al. | |
| 2022/0266449 A1 | 8/2022 | Hasegawa et al. | |
| 2022/0287676 A1 | 9/2022 | Steines et al. | |
| 2022/0288669 A1 | 9/2022 | Goodall et al. | |
| 2022/0383531 A1 | 12/2022 | Santini et al. | |
| 2023/0046644 A1 | 2/2023 | Themelis | |
| 2023/0157525 A1 | 5/2023 | Hunter et al. | |
| 2023/0200920 A1 | 6/2023 | Mittman | |
| 2023/0270321 A1 | 8/2023 | Breton et al. | |
| 2024/0033925 A1 | 2/2024 | Mourlam et al. | |
| 2024/0033928 A1 | 2/2024 | Mourlam et al. | |
| 2024/0038413 A1 | 2/2024 | Naber et al. | |
| 2024/0039254 A1 | 2/2024 | Lindquist et al. | |
| 2024/0058935 A1 | 2/2024 | Nichols | |

FOREIGN PATENT DOCUMENTS

| | | |
|---|---|---|
| JP | 6840052 | 3/2021 |
| KR | 102207182 B1 | 1/2021 |
| WO | 9532078 A1 | 11/1995 |
| WO | 2017220822 A1 | 12/2017 |
| WO | 2020203793 A1 | 10/2020 |

OTHER PUBLICATIONS

U.S. Appl. No. 17/875,796, filed Jul. 28, 2022, Robert Nichols.
U.S. Appl. No. 17/875,821, filed Jul. 28, 2022, William Naber.
U.S. Appl. No. 17/875,990, filed Jul. 28, 2022, David F. Lindquist.
U.S. Appl. No. 17/875,990, Non-Final Office Action dated Feb. 9, 2023.
IStock, "Lineman hanging new "pot" aka transformer on telephone pole stock photo", Apr. 22, 2016, https://www.istockphoto.com/photo/lineman-hanging-new-pot-aka-transformer-on-telephone-pole-gm951987990-259883755 (Year: 2016).
Owen-Hill, "3 types of robot singularities and how to avoid them," Mar. 2, 2016, Robohub.org, https://robohub.org/3-types-of-robot-singularities-and-how-to-avoid-them/ (Year: 2016).
PCT Patent Application PCT/US2023/028564 International Search Report and Written Opinion of the International Searching Authority issued Nov. 22, 2023.
U.S. Appl. No. 17/875,990, Notice of Allowance dated Apr. 21, 2023.
U.S. Appl. No. 17/875,674, Final Office Action dated Feb. 15, 2023.
U.S. Appl. No. 17/875,674, Non-Final Office Action dated Oct. 13, 2022.
U.S. Appl. No. 17/875,674, Notice of Allowance and Interview Summary dated Jun. 16, 2023.
U.S. Appl. No. 17/875,743, Final Office Action dated Jan. 10, 2023.
U.S. Appl. No. 17/875,743, Non-Final Office Action dated Sep. 22, 2022.
U.S. Appl. No. 17/875,743, Notice of Allowance and Interview Summary dated Mar. 27, 2023.
U.S. Appl. No. 17/875,796, Non-Final Office Action dated Apr. 5, 2023.
U.S. Appl. No. 17/875,796, Notice of Allowance dated Aug. 2, 2023.
U.S. Appl. No. 18/368,155 Non-Final Office Action issued Jun. 21, 2024.
U.S. Appl. No. 18/385,545 Notice of Allowance issued Jul. 15, 2024.
U.S. Appl. No. 18/224,278 Non-Final Office Action issued Sep. 5, 2024.
U.S. Appl. No. 18/197,438 Notice of Allowance issued Aug. 5, 2024.
U.S. Appl. No. 18/197,438 Corrected Notice of Allowance issued Aug. 28, 2024.
U.S. Appl. No. 18/368,155 Notice of Allowance issued Oct. 29, 2024.

* cited by examiner

AUTONOMOUS AND SEMI-AUTONOMOUS CONTROL OF AERIAL ROBOTIC SYSTEMS

RELATED APPLICATIONS

This patent application is a continuation application claiming priority benefit, with regard to all common subject matter, of commonly assigned and concurrently filed U.S. patent application Ser. No. 17/875,710, filed Jul. 28, 2022, and entitled "AUTONOMOUS AND SEMI-AUTONOMOUS CONTROL OF AERIAL ROBOTIC SYSTEMS." The above-referenced patent application is hereby incorporated by reference in its entirety into the present application.

FIELDS

The present disclosure generally pertains to aerial robotic systems as well as methods and operations associated with aerial robotic systems. Specifically, the disclosure relates to autonomous and semi-autonomous control of aerial robotic systems.

BACKGROUND

An aerial robotic system may be used to perform work at an aerial worksite, including aerial worksites associated with electrical transmission lines. Aerial worksites as well as electrical transmission lines are accompanied by a variety of hazards. Certain hazards can be mitigated by using an aerial robotic system to perform at least some of the work. Additionally, or in the alternative, certain tasks can be streamlined by use of an aerial robotic system.

Furthermore, human control of aerial robot systems is not without hazard. It may be difficult to see the aerial work environment for a user standing on the ground or view the aerial work environment through cameras mounted on or near the aerial robot system. Accordingly, the user may unknowingly strike a component of the electrical transmission system or may not be able to perform work tasks efficiently.

What is needed are systems and methods of obtaining information of the aerial work environment and automatic some features of the work such that a human operator is not necessary.

SUMMARY

Aspects, features, and advantages of the presently disclosed subject matter are set forth in part in the following description. Further aspects and advantages may be apparent from the description or through practicing the presently disclosed subject matter.

In a first embodiment, the present disclosure is directed to robot system for performing automated tasks in an operational environment of an aerial device. The robot system comprises at least one processor, a robot unit comprising at least one manipulator configured to perform a task in the operational environment, a camera for obtaining images of the operational environment, a sensor associated with the robot unit, and one or more non-transitory computer-readable media storing computer-readable instructions that, when executed by the at least one processor, perform a method of completing the task. The method comprises obtaining, by the camera, information indicative of a location of an object in the operational environment, obtaining sensor data from the sensor, wherein the sensor data is indicative of a state of the at least one manipulator, and performing the task based on the location of the object and the sensor data.

In a second embodiment, the present disclosure is directed to a method of performing automated tasks by a robot unit in an operational environment of an aerial device. The method comprises obtaining, by a camera, information indicative of a location of an object in the operational environment, obtaining sensor data by a sensor associated with the robot unit, wherein the sensor data is indicative of a state of at least one manipulator of the robot unit, and manipulating the object by the at least one manipulator to complete a task, wherein the manipulating is based at least in part on the location of the object and the sensor data from the sensor.

In a third embodiment, the present disclosure is directed to a robot system for performing automated tasks in an operational environment of an aerial device. The robot system comprises at least one processor, a robot unit comprising at least one manipulator configured to perform a task in the operational environment, a camera for obtaining images of the operational environment, a sensor associated with the robot unit, and one or more non-transitory computer-readable media storing computer-readable instructions that, when executed by the at least one processor, perform a method of completing the task. The method comprises obtaining, by the camera, information indicative of a location of an object in the operational environment, obtaining sensor data from the sensor, wherein the sensor data is indicative of a state of the at least one manipulator, and manipulating the object by the at least one manipulator to complete the task, wherein the manipulating is based at least in part on the location of the object and the sensor data from the sensor.

In a fourth embodiment, the techniques described herein relate to the robot system described in embodiments one and three, wherein the computer-executable instructions are further executed to perform receiving from a user a first input indicative of the task to be performed and receiving from the user a second input indicative of initiating execution of the task.

In a fifth embodiment, the techniques described herein relate to the robot system described in embodiments one, three, and four, wherein the computer-executable instructions are further executed to perform generating an inertial coordinate system including coordinates of the object, determining tool coordinates of a tool coupled to the at least one manipulator, and autonomously performing the task based on the location of the object and the tool coordinates in the inertial coordinate system.

In a sixth embodiment, the techniques described herein relate to the robot system described in embodiments one and three through five, wherein the computer-executable instructions are further executed to perform classifying the object by a machine learning algorithm, and selecting the task to be performed based on the classifying and the tool.

In a seventh embodiment, the techniques described herein relate to the robot system described in embodiments one and three through six, further including a boom assembly including a boom tip supporting the at least one manipulator, wherein the computer-executable instructions are further executed to perform detecting a boom tip location, generating an inertial coordinate system including boom tip coordinates, determining location coordinates indicative of a location of operation for the at least one manipulator, and autonomously moving the boom tip to position the at least one manipulator in the location of the operation.

In an eighth embodiment, the techniques described herein relate to the robot system described in embodiments one and three through seven, wherein the computer-executable instructions are further executed to receive the location of the operation as a waypoint that is uploaded by a user.

In a ninth embodiment, the techniques described herein relate to the robot system described in embodiments one and three through eight, wherein the computer-executable instructions are further executed to receive the boom tip location by a location sensor, move the at least one manipulator to the waypoint based at least in part on the location from the location sensor, and move the at least one manipulator into the location of the operation using the camera.

In tenth embodiment, the techniques described herein relate to the robot system described in embodiments one and three through nine, wherein the robot unit is electrically insulated from a base of the aerial device.

In an eleventh embodiment, the techniques described herein relate to the method described in embodiment two, wherein the task is manipulating one of a tie wire, a bolt, a nut, a capacitor, or a transformer.

In a twelfth embodiment, the techniques described herein relate to the method described in embodiments two and eleven, further including generating an inertial coordinate system, wherein the state of the at least one manipulator includes at least a location in the inertial coordinate system.

In a thirteenth embodiment, the techniques described herein relate to the method described in embodiments two and eleven through twelve, further including applying inverse kinematics to move the robot unit to autonomously perform the task.

In a fourteenth embodiment, the techniques described herein relate to the method described in embodiments two and eleven through thirteen, further including receiving a waypoint indicative of coordinates in the inertial coordinate system, and further including controlling actuators to move the robot unit to the waypoint to perform the task.

In a fifteenth embodiment, the techniques described herein relate to the method described in embodiment two and eleven through fourteen, wherein the camera is a first camera and is coupled to the robot unit, and further including obtaining images from a second camera attached to an end of a rod distal the robot unit, wherein the images are out of view of the first camera.

In a sixteenth embodiment, the techniques described herein relate to the method described in embodiments two and eleven through fifteen, further including generating a three-dimensional representation of the object, and autonomously performing the task.

These and other aspects, features, and advantages thereof are further understood with reference to the following description, the accompanying drawing FIGURES, and the appended claims. The foregoing summary is not intended to identify key features or essential features of the claimed subject matter, nor is it intended to limit the scope of the claimed subject matter.

BRIEF DESCRIPTION OF THE DRAWING FIGURES

Embodiments of the present are described in detail below with reference to the attached drawing FIGURES, wherein.

Figure 1:
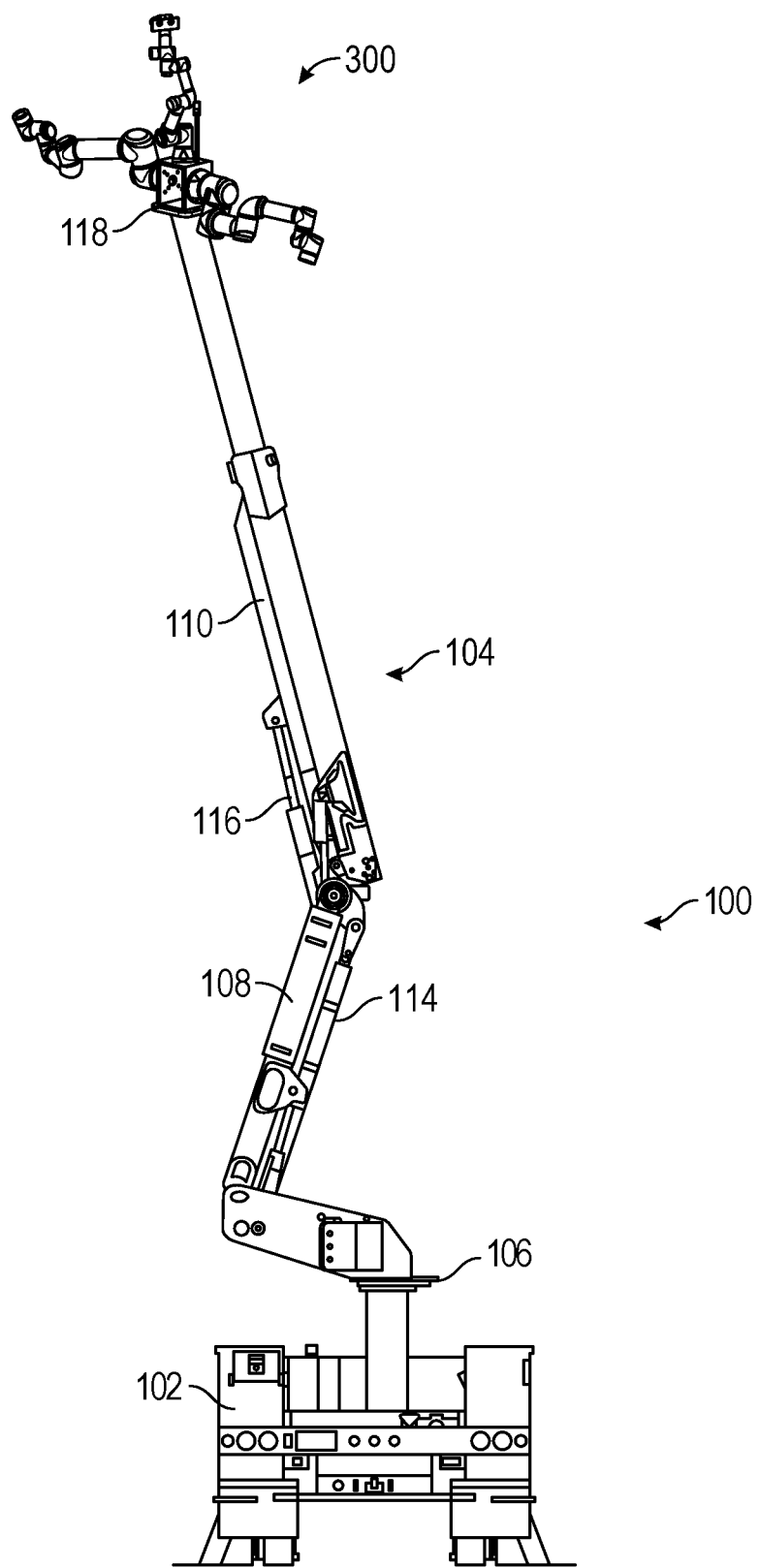
FIG. 1 depicts an aerial device relating to some embodiments.

The drawing FIGURES illustrate example embodiments of the presently disclosed subject matter. The claims are not limited to the example embodiments depicted in the drawing FIGURES. The aspects and features depicted in the drawing FIGURES are not necessarily to scale. Repeat use of reference characters in the specification and drawing FIGURES represent the same or analogous aspects or features.

DETAILED DESCRIPTION

The following detailed description references the accompanying drawing FIGURES that illustrate example embodiments of the presently disclosed subject matter. The present disclosure, including the example embodiments depicted in the drawing FIGURES, describe features, aspects, and advantages of the of the disclosed subject matter by way of explanation and not limitation. Various modifications, combinations, and variations can be made to the example embodiments or to aspects or features thereof without departing from the scope of the presently disclosed subject matter. Thus, the present disclosure encompasses such modifications, combinations, and variations. The present disclosure provides sufficient detail to enable those skilled in the art to practice the claimed subject matter. The present disclosure is, therefore, not to be taken in a limiting sense. The scope of the invention is defined only by the appended claims, along with the full scope of equivalents to which such claims are entitled.

In this description, references to "one embodiment," "an embodiment," or "embodiments" mean that the feature or features referred to are included in at least one embodiment of the presently disclosed subject matter. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments but is not necessarily included. Thus, the scope of the presently disclosed subject matter encompasses a variety of combinations and/or integrations of the example embodiments in this description.

The terms "a," "an," and "the" do not denote a limitation of quantity but rather denote the presence of at least one of the referenced item. The terms "first," "second," "third," and so forth may be used interchangeably to distinguish one item from another and are not intended to signify location or importance of the respective item. Range limitations in this description and in the claims include all endpoints, and all such endpoints are independently combinable to provide another range limitation.

The term "coupled," when used herein with reference to at least two objects, refers to direct or indirect mechanical or physical contact between two objects in which the two objects are linked, connected, fastened, or joined with one another, including by way of an interference fit, one or more fastening elements or hardware, by welding, or the like. The term "coupled" includes objects that are removably coupled with one another.

The term "integral" or "integrally formed," when used herein with reference to at least to elements, refers to two elements that respectively define a portion, part, or piece of one and the same object, and/or two objects that are permanently coupled to one another such that the objects cannot be separated from one another without destructive means. The term "integral" includes a portion, part, or piece of an element that cannot be separated from the whole of the element without destructive means. For example, the term "integral" may refer to objects that are welded together, objects that are formed or cast as a single unit, as well as portions, parts, or pieces of a single, monolithic object.

Generally, the present disclosure provides an aerial device comprising a robot unit on a boom tip of an aerial device for autonomously or semi-autonomously performing tasks. The robot unit may comprise a plurality of manipulators and various sensors for detecting a state of the robot unit as well as the operational environment of the robot unit and a boom assembly of the aerial device. One or more processors may execute computer-executable instructions to perform tasks that may be initiated and controlled by an operator or autonomously. The operation of the robot may be based on the detection of the state of the robot as well as the operation environment, the task to be performed, and the tool to perform the task.

FIG. 1 depicts an aerial device 100 relating to some embodiments. Aerial device 100 may be attached to utility vehicle 102, as shown. In some embodiments, aerial device 100 comprises a boom assembly 104 and a turntable 106 that may be disposed on utility vehicle 102, as shown. The boom assembly 104 may comprise a lower boom section 108 attached to the turntable 106 and an upper boom section 110 pivotably attached to an end of the lower boom section 108, as shown. In some embodiments, either or both of the lower boom section 108 and the upper boom section 110 may include a telescoping portion for telescopically extending and retracting the length of the boom assembly 104. Further, in some embodiments, a utility platform may be included, attached at a distal end of the upper boom section 110. Alternatively, or additionally, in some embodiments, remote assembly system 300 may be disposed at the distal end of the upper boom section 110. In some embodiments, and as described in greater detail below, the remote assembly system 300 may comprise a robot unit adapted for performing telecommunications repair, powerline repair, general repair work, or other actions that may be performed by a robot. For example, the robot unit may comprise one or more utility tools for performing actions such as sawing, cutting, screwing, wiring, or other actions associated with repair work. In some embodiments, the boom assembly 104 is used to position the remote assembly system 300 in a remote location, such as, for example adjacent to an energized power line.

In some embodiments, the aerial device 100 may be used for performing work on or near high-voltage power lines. As such, the aerial device 100 may be operated near electrically powered high-voltage cables. In some embodiments, remote assembly system 300 and boom assembly 104 comprise insulating material for electrically insulating aerial device 100. Furthermore, any electrical components disposed in the utility platform and on boom assembly 104 may be self-contained and separate from the electrical components of utility vehicle 102. As such, a dielectric gap is created between remote assembly system 300 and utility vehicle 102. In some embodiments, utility vehicle 102 may generally be referred to as a base, and may be any of a vehicle, a crane, a platform, a truck bed, a mechanical tree trimming apparatus, a hydraulic lift, or any other base capable of supporting boom assembly 104 and remote assembly system 300, as will be described in further detail below.

In some embodiments, the boom assembly comprises one or more cylinders for controlling motion of the boom assembly 104 such as a lower boom cylinder 114 disposed between the turntable 106 and the lower boom section 108 and an upper boom cylinder 116 disposed between the lower boom section 108 and the upper boom section 110, as shown. In some embodiments, the cylinders 114 and 116 may be actuated hydraulically using a hydraulics system of the boom assembly 104. However, embodiments are contemplated in which other suitable actuation techniques may be employed to actuate the cylinders 114 and 116 such as, for example, electrical actuation, pneumatic actuation, and magnetic actuation. Further, in some embodiments, a combination of different actuation techniques may be used. Embodiments are contemplated in which the boom assembly 104 comprises one or more rotary actuators. For example, in some embodiments, the boom assembly 104 comprises a slew drive for controlling rotation of a respective joint of the boom assembly 104.

In some embodiments, the lower boom cylinder 114 may control the angle of rotation of the lower boom section 108 relative to the turntable 106. Similarly, the upper boom cylinder 116 may control the angle of rotation of the upper boom section 110 relative to the lower boom section 108. Additionally, in some embodiments, a pivotable connection 118 may be included between the distal end of the upper boom section 110 and remote assembly system 300 for controlling the angle of remote assembly system 300. In some such embodiments, the pivotable connection 118 may be configured to automatically maintain an upright orientation of the remote assembly system 300. For example, the pivotable connection 118 may include one or more gyroscopes and/or interface with a control system for maintaining the upright orientation of the remote assembly system 300 such that the remote assembly system 300 is held in an upright position regardless of the orientation of the rest of the boom assembly 104. Additionally, or in the alternative, embodiments are contemplated in which the orientation of the remote assembly system 300 may be controlled manually by an operator using one or more input devices.

Figure 2:
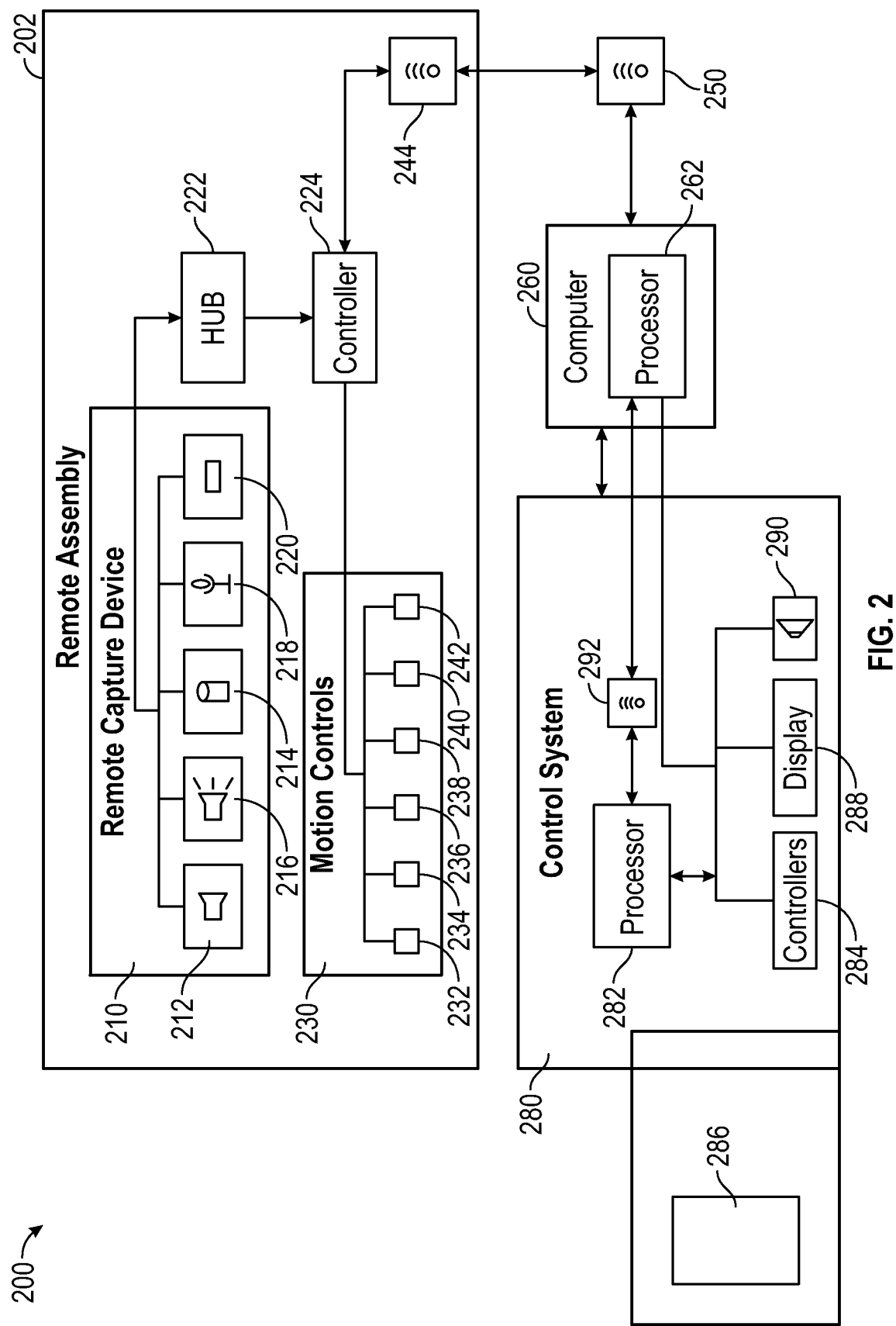
FIG. 2 depicts an exemplary system architecture of a robot unit comprising a control system and manual controls relating to some embodiments.

FIG. 2 depicts an exemplary block diagram 200 related to embodiments of the present disclosure. In some embodiments, the remote assembly system 300 comprises various assemblies, sub-assemblies, parts, or components for capturing sensory information and/or for performing actions, such as repair work in a telecommunication setting. The remote assembly system 300 may comprise various circuitry, parts, or other components for capturing sensory information, including video, three-dimensional depth information, audio, and other sensory data. Further, the remote assembly system 300 may comprise a manually controlled or autonomous robot unit that may be positioned at the end of the boom assembly 104 for interacting with a work site to perform one or more task. For example, as described above, in many real-life scenarios, tasks to be performed may not be discovered until reaching the job site, and accordingly, the robot unit may comprise a variety of tools, features, or functions to respond to a variety of different tasks. Additionally, as described in greater detail below, remote robot assembly may further comprise one or more parts, components, or features for providing an operator with sensory information, providing the operator with additional information about the job site to improve efficiency, efficacy, and/or safety of both the remote assembly system 300 and the operator.

As depicted in the block diagram 200, a remote assembly 202 comprises at least a remote capture device 210, a computer 260, and a control system 280. In some embodiments, and as described in greater detail herein, the remote capture device 210 may be a device configured and adapted for the capturing of sensory information and may be positioned on a robot unit for the capturing of sensory information that may be utilized by computer 260, to present information to an operator via control system, among other purposes. FIG. 2 depicts exemplary sensors, cameras, and other apparatuses that may be utilized by remote capture device 210 for the capturing of sensory information. As described in greater detail below, remote capture device 210 may be mounted or positioned on a selectively movable mount or portion of a robot unit. For example, the robot unit may be a robot unit positioned at the end of a boom assembly for aerial application. However, remote capture device 210 may also be used with a robot unit that is not attached on a boom assembly, and for example, may be utilized with a robot unit for ground application or attached to a mechanical arm or an aerial drone. Accordingly, via the robot unit, sensory information may be captured by remote capture device 210.

Through selective inputs, including both manually inputted instructions and/or automated instructions, remote capture device 210 may capture video, still images, three-dimensional depth information, audio, electrical conductivity, voltage, among other information that may be captured by a sensor or recording device. For example, remote capture device 210 may comprise camera 212 for the capturing of video or still images (collectively, "video"). In some embodiments, camera 212 may be at least one camera or a plurality of cameras. The camera 212 may be a camera positioned on remote capture device 210 for the capturing of video within a selected field of view. The resolution of the video captured by camera 212 may vary, but in some embodiments, camera 212 may be a camera configured for capturing in at least 720 p resolution but may capture in higher resolution including but not limited to 1080 p, 2K, 4K, or 8K resolution. However, it will be appreciated that the camera 212 may be any currently known or yet to be discovered camera for capturing video. Video captured from camera 212 may be stored locally at remote capture device at a local memory 214. Local memory 214 may be any of the storage or memory described below with respect to FIG. 12. The storing of video at local memory 214 may aid in providing a failsafe or backup storage of captured video in the event of a transmission or upload failure. Further, the storing of video at local memory 214 may aid in situations of poor wireless connection or if a direct line becomes loos or interrupted, preventing the immediate transmission of captured video. Optionally or additionally, video captured from camera 212 may be transmitted to computer 260 for processing, analyzing, storage, and/or for later transmitting to control system 280. In further embodiments, video captured from camera 212 may be directly transmitted to control system 280 for processing.

In some embodiments, remote capture device 210 may further comprise at least one three-dimensional camera 216 or other device configured for capturing three-dimensional depth information. As described in greater detail below, the three-dimensional camera 216 may be utilized for capturing three-dimensional depth information within a field of view for creating a point cloud, 3-D model, or other digital representation of an object or area scanned or viewed by the three-dimensional camera 216. Three-dimensional camera 216 may be operated in conjunction with, or independent from camera 212 or other components or parts of remote assembly 202 and/or remote capture device 210. As described in greater detail below, in response to instructions or an input, three-dimensional camera 216 may begin capturing three-dimensional depth information about an object or area within a field of view. Like the captured video with respect to camera 212, the three-dimensional depth information captured by three-dimensional camera 216 may be saved locally at memory 214. In some embodiments, remote capture device 210 may comprise a separate memory 214 for video captured by camera 212 and a separate memory 214 for three-dimensional information captured by three-dimensional camera 216. As described in greater detail below, remote capture device 210 may comprise a microphone 218 and/or sensor 220, which may be one or more or a plurality of sensors, for capturing additional sensory information. Accordingly, in some embodiments, a separate and distinct memory 214 may be used for each sensory capture device (i.e., camera 212, three-dimensional camera 216, microphone 218, and/or sensor 220). In further embodiments, remote capture device 210 may comprise a single memory 214 for the storing of all captured sensory information. As described above and in further embodiments, three-dimensional information may be directly sent to computer 260 in addition to or instead of storing locally at memory 214.

In addition to capturing video and/or three-dimensional information, it may also be advantageous for remote capture device 210 to capture additional sensory information that may be presented to an operator or processed by computer 260. For example, in certain scenarios it may be advantageous for remote capture device 210 to capture audio via at least one microphone 218. Continuing with the running example, a remote assembly 202 for use with telecommunications repair may utilize audio information for diagnostic or safety purposes. For example, audio information may capture the sounds of the job site and the audio information may be processed to determine if a job site is safe. Accordingly, in some embodiments, remote capture device 210 may comprise at least one microphone 218 for the capturing of audio information. Similar to the video and three-dimensional information as described above, captured audio information may be stored locally at a memory 214 and/or transmitted to a computer 260 and/or control system 280.

Similar to audio information, remote capture device 210 may further comprise sensor 220 for the capturing of additional sensory information, metrics, or data. For example, continuing with the running example, the remote capture device 210 may be used with a remote assembly 202 positioned at the end of boom assembly 104 for telecommunication or powerline work. In such a work application, the remote assembly 202 may be working on or near live powerline or other conductive lines transferring electricity. Accordingly, in some embodiments, remote capture device 210 may comprise sensor 220 configured as an electricity sensor for determining whether a cable or powerline has electricity running through it. However, it will be appreciated that remote capture device 210 may comprise additional sensors configured and adapted for providing remote capture device and/or remote assembly 202 with additional information. By way of non-limiting example, sensors may be sensor 220 may comprising any of the following sensors: a gyroscope, an accelerometer, a thermometer, a barometer, a light emitter, among other sensors that may be utilized in the intended application of remote assembly 202.

In some embodiments, the remote assembly 202 may further comprise at least one digital hub 222. In some embodiments, the remote assembly 202 further comprises at least one digital hub 222. The digital hub 222 may receive the captured sensory information from remote capture device and convert the captured sensory information into a format suitable for transmitting to computer 260 and/or control system 280. In some embodiments, the digital hub 222 is a USB Hub, such as, for example, a USB 3.0.

As further depicted in FIG. 2, remote assembly 202 may further comprise a controller 224. In some embodiments, controller 224 may be a processor or other circuitry or computer hardware for receiving commands or instructions from control system 280 and/or computer 260 and for relaying or providing commands to remote capture device 210 and/or motion controls 230. Accordingly, in some embodiments, instructions or commands from controller 224 may be sent to remote capture device 210. For example, instructions sent from controller 224 to remote capture device 210 may include instructions to begin recording video via camera 212. However, it will be appreciated that instructions sent from controller 224 may cause any of the components of remote capture device 210 to begin capturing sensory information, including but not limited to three-dimensional information, audio information, or other sensory information captured by any of the sensors 220 of remote capture device 210. Additionally, controller 224 may be used to send instructions to cause remote assembly 202, remote capture device 210, and/or motion controls 230 to perform other actions corresponding to the instructions. For example, instructions from controller 224 may instruct remote capture device 210 to store captured sensory information on memory 214. Additionally, instructions from controller 224 may be sent to motion controls 230 to instruct remote assembly 202 to perform a movement. Further, controller 224 may be in communication with transceiver 244 for communicating with computer 260 and/or control system 280 to send sensory information or other data or information to computer 260 and/or control system 280. Similarly, controller 224 may further be configured for receiving instructions, commands, or other information from computer 260 and/or control system 280.

As further depicted in the block diagram of FIG. 2 and in some embodiments, remote assembly 202 may further comprise motion controls 230. Motion controls 230 may be configured and adapted for controlling the movement of remote assembly 202, including any utility arms or camera mounts as described in greater detail below. In some embodiments, remote assembly 202 may comprise a 6 DOF robot unit configured with utility arms and/or camera mounts that can move with 6 DOF. Accordingly, motion controls 230 may be configured to provide instructions or commands to remote assembly 202 to move in 6 DOF. In some embodiments, motion controls may comprise x-axis control 232, y-axis control 234, z-axis control 236, pitch control 238, yaw control 240, and/or roll control 242 for moving assembly 202 with 6 DOF. It will be appreciated however, that remote assembly 202 may comprise varying designs, and in some embodiments, may move in fewer than 6 DOF. Accordingly, in further embodiments, motion controls 230 may comprise controls configured and adapted for moving remote assembly 202 in an appropriate number of planes.

As described above, motion controls 230 may be in communication with controller 224. Instructions or commands from controller 224 may be sent to motion controls 230. Upon receipt of the instructions, the corresponding controls 232, 234, 236, 238, 240, and/or 242 may be instructed to cause movement of the remote assembly 202 based on the received instructions. As described above, one or more arms or limbs of remote assembly 202 may be configured to move with 6 DOF. Based on the instructions, the corresponding motion controls 230 may cause movement of the remote assembly 202 to correspond to the instructions.

As described above, remote assembly 202 may be communicatively coupled to computer 260. In some embodiments, computer 260 may be directly coupled to remote assembly 202, such that computer 260 and remote assembly 202 are a combined system. For example, computer 260 may be directly installed into a frame or body of remote assembly 202. Accordingly, remote assembly 202 and computer 260 may be in direct communication through cables or other direct methods. In further embodiments, computer 260 may be located external to remote assembly 202. When located externally, remote assembly 202 and computer 260 may nevertheless be communicatively coupled. For example, in some embodiments, remote assembly 202 and computer 260 may be coupled through a physical connection such as an Ethernet cable or USB cable. In further embodiments, remote assembly 202 and computer 260 may be coupled through a wireless connection, such as WIFI, Bluetooth®, cellular connection, or another wireless connection. In embodiments in which computer 260 and remote assembly 202 are connected through a wireless connection, transceiver 244 may communicate with another transceiver 250 coupled or otherwise in communication with computer 260.

In some embodiments, computer 260 may receive and process sensory information captured by remote capture device 210 of remote assembly 202. Accordingly, computer 260 may comprise at least a processor 262 for executing commands, which may include instructions for processing, analyzing, or utilizing captured sensory information. For example, as described in greater detail below, computer 260 may utilize captured three-dimensional information to generate a point-cloud, three-dimensional model, or other digital representation of an object or area captured by remote capture device 210.

In some embodiments, control system 280 may be an interface, apparatus, or system providing a user with an interactive medium for interacting with computer 260 and/or remote assembly 202. For example, in some embodiments, control system 280 may comprise at least a processor 282, at least one controller 284, at least one display 288, at least one sensor 290, and at least one transceiver 292. As described in greater detail below, some embodiments of the present teachings provide for a method of controlling remote assembly 202 from a remote location. Continuing with the running example, oftentimes telecommunications repair or powerline repair sometimes occur during or immediately after a severe weather storm. This type of scenario can be wrought with dangers such as exposed and live powerlines, high winds, lightning, and other dangers that pose a risk to human workers. Accordingly, it may be advantageous for an operator of remote assembly 202 to control remote assembly 202 in a safe location, such as in a work truck or building away from the job site. Accordingly, control system 280 may comprise at least one controller 284, providing an interactive means for a user to input commands or instructions for controlling or manipulating remote assembly 202. Controller 284 may be any interface for inputting commands or instructions that can be transmitted and processed by a computer or other hardware. Exemplary embodiments of controller 284 are provided below with respect to FIG. 4, however, it will be appreciated that the depicted embodiments are intended to be illustrative, rather than limiting. By way of non-limiting example, controller 284 may comprise hand-held motion control controllers. As described in greater detail below, the motion control controllers may be beneficial for an operator to perform specific movements or actions that can be captured and relayed to remote assembly 202 to perform. Through the use of motion-control controllers, an operator may be provided with a sensory effect similar to being at the job site and performing the actions themselves. However, controller 284 is not limited to motion controls and instead, controller 284 may be any interface for an operator to input instructions or commands for remote assembly 202. For example, in further embodiments, controller 284 may be a handheld controller, similar to that of a video game controller comprising thumbsticks, buttons, triggers, and/or other interfacing inputs. In further embodiments, controller 284 may comprise a joystick and button design. In even further embodiments, controller 284 may be a mouse and keyboard. In even further embodiments, controller 284 may be configured as a glove or interactive model of a hand, allowing an operator to perform native hand manipulations which may be captured and transmitted to remote assembly 202. In even further embodiments, controller 284 may comprise a camera component or other motion capture component for capturing the movement of an operator. For example, in addition to, or in place of a physical controller handled by the operator, a camera component may capture the movement of the operator. The captured movement may be transmitted to computer 260 for translation or mapping movement of remote assembly 202. Optionally, or additionally, motion capture aids, such as motion capture dots, may also be used for capturing movement of the operator. In some embodiments, may It will be appreciated that the examples provided herein are intended to be illustrative, rather than limiting, and that controller 284 may be any apparatus or method of receiving instructions or an input from an operator.

In some embodiments, control system 280 may further comprise a power medium 286 for powering one or more parts or components of control system, including for example controller 284, display 288, or the at least one sensor 290, or any combination thereof. In some embodiments, a single power medium may power all parts or components of control system 280. In further embodiments, individual parts or components of control system 280 may comprise a separate and distinct power medium 286. For example, a first power medium 286 may be used for powering controller 284 and a second power medium 286 may be used for powering display 288. Power medium 286 may be any conventionally known power source for providing power to an electrical device, including but not limited to an internal power source such as a battery, or an external battery source such as an electrical outlet.

As further depicted in FIG. 2, control system 280 may further comprise at least one display 288. In some embodiments, display 288 may be a monitor, touchscreen, television screen, or other display with reference to FIG. 12 below. In some embodiments, at least a portion of the captured sensory information from remote capture device 210 may be displayed on display 288 for an operator to view. For example, captured video may be displayed on display 288. Providing sensory information on display 288 may provide an operator with a more immersive feel when remotely operating remote assembly 202. Through a real-time video feed, an operator may experience the job site as if the operator was physically present, even if the operator is in a safe location miles away. Additionally, providing sensory information to an operator via display 288 may aid the operator in inputting instructions or commands via controller 284.

In some embodiments, control system 280 may further comprise at least one sensor 290, which may provide additional sensory affect to the operator and/or capture additional inputs that may be used by computer 260 to provide instructions to remote assembly system 300. In some embodiments, one or more sensors may be combined with controller 284 and/or one or more sensors may be combined with display 288. For example, in some embodiments, sensor 290 may be at least one speaker or sound emitting device to provide the operator with audio information captured from remote capture device 210 or pre-recorded or pre-rendered audio. In further embodiments, the at least one sensor 290 may be one of an accelerometer, a gyroscope, a light sensor, or any other type of sensor 290 suitable to detect the viewing angle of the user or the movement, position, or angle of the operator's body.

In some embodiments, and as described in greater detail below, an operator may utilize controller 284, display 288, and the at least one sensor 290 to provide instructions to remote assembly 202, which may be analyzed and translated into instructions to cause remote assembly 202 to move or perform an action. As also described in greater detail below, an operator may input instructions or commands through control system 280. In some embodiments, inputs may be inputted or captured by a combination of controller 284 and display 288. For example, display 288 may be coupled to a head-mounted unit as described in greater detail below. An operator may move their head or torso with sensor 290 capturing the movement and/or viewing angle of the operator. The captured movement data or viewing angle may be sent to computer 260 via transceiver 292, and computer 260 may take the captured movement data or viewing angle and translate into instructions for causing remote assembly 202 to move and mimic or replicate the operator's movement and match the viewing angle of the operator.

Figure 3:
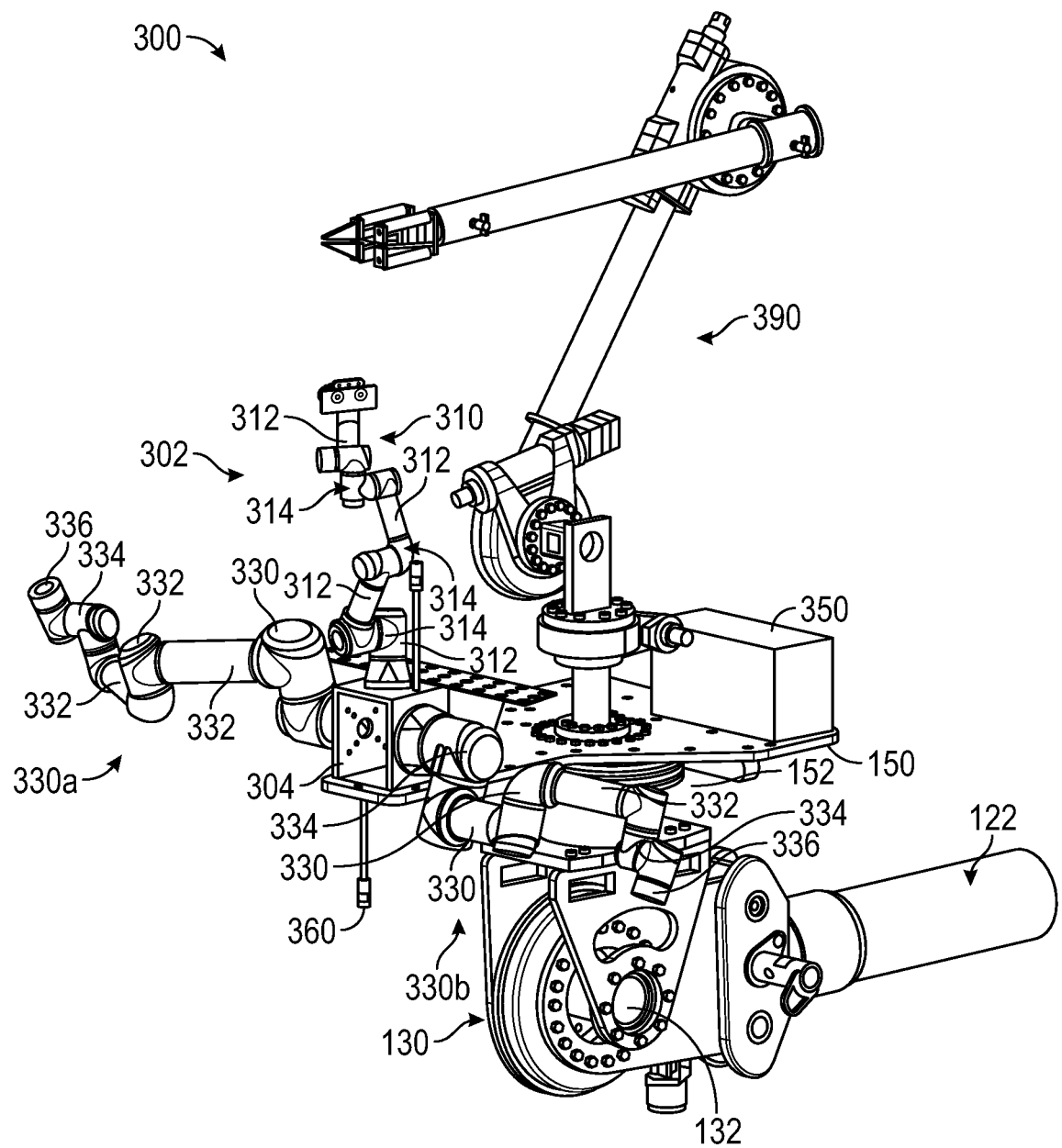
FIG. 3 depicts an exemplary six-degree-of-freedom robot unit relating to some embodiments.

FIG. 3 is an exemplary embodiment of a remote assembly system 300. In some embodiments, the remote assembly system 300 may comprise various assemblies, sub-assemblies, parts, or components, including but not limited to a robot unit 302 affixed at the end of a boom assembly 104. Further, the remote assembly system 300 may correspond to the remote assembly 202 as described above with respect to FIG. 2 and may comprise any and all of the components or parts as described above. In some embodiments, robot unit 302 may be configured and adapted to receive instructions from a computer or operator to perform a corresponding movement or action. In some embodiments, robot unit 302 may be a fully manually controlled robot, wherein the robot unit 302 will not perform a movement or action absent an instruction provided from an operator. In further embodiments, robot unit 302 may be fully a fully automated robot, wherein the robot unit 302 performs actions or movements based on pre-programmed instructions for automation. In even further embodiments, robot unit 302 may be a robot configured to respond to both manually inputted instructions and automated programming. Accordingly, the various movements or actions performed by robot unit 302 and described herein may be performed based on manually provided instructions and/or automated programming.

As described above and as illustrated in FIG. 3, in some embodiments remote assembly system 300 may be positioned at the distal end of boom assembly 104. As depicted, in some embodiments, distal end of boom assembly 104 may comprise a pivot joint 130 comprising a motor 132. In some embodiments, pivot joint 130 may be used to change an angle or position of remote assembly system 300. In further embodiments, pivot joint 130 may be paired with a sensor, such as a gyroscope, to aid in maintaining a leveled position of remote assembly system 300. As further depicted in FIG. 3, pivot joint 130 may further act as an attachment point between remote assembly system 300 and boom assembly 104. For example, a base 150 may be coupled to pivot joint. Base 150 may be adapted and configured for receiving and coupling remote assembly system 300. Accordingly, through such coupling, remote assembly system 300 may be secured and attached to boom assembly 104. In some embodiments, base 150 may comprise a generally planar design for accepting and securing one or more assemblies, sub-assemblies, parts, or components of remote assembly system 300. Further, the size and shape of base 150 may vary, and may be dependent on design of remote assembly system 300. Further, in some embodiments, base 150 may further comprise a motorized turntable 152. Motorized turntable 152 may be a power motor train system for rotating base 150. The rotation of base 150 may be advantageous for positioning remote assembly system 300 during use.

In some embodiments, remote assembly system 300 may generally comprise a robot unit 302. Robot unit 302 may be a controllable robotics unit that can perform a range of movements and actions, such as performing repair work in a telecommunication setting. In some embodiments, and as described in greater detail below, robot unit 302 may be 6 DOF robotics assembly, configured and adapted for mimicking the movement of an operator utilizing a VR controller. Particularly, through a 6-DOF configuration, robot unit 302 may substantially mimic the torso, neck, and arm movements of the operator. Through such movement, robot unit 302 may perform a greater range of movements and/or provide a more immersive experience to an operator than pre-existing systems.

In some embodiments, robot unit 302 may comprise a central hub 304. Central hub 304 may be a central housing or base, which may house a processor, a power source, circuitry, a wireless communication means among other electronics for robot unit 302, including the components described above with respect to FIG. 2. Additionally, central hub 304 may act as a coupling or attachment member, securing robot unit 302 to base. Even further, central hub 304 may also act as a receiving point for one or more parts or components of robot unit 302. For example, and as described below, robot unit 302 may comprise at least one utility arm and at least one camera mount. Accordingly, central hub 304 may receive and couple with the at least one utility arm and the at least one camera arm.

To collect sensory information, including but not limited to video and three-dimensional depth information, robot unit 302 may comprise at least one camera mount 310. Camera mount 310 may be a 6 DOF, selectively controllable robotic arm, that may couple to central hub 304. As described in greater detail below, robot unit 302 may receive movement instructions or commands from computer 260 that may cause camera mount 310 to move or change position. For example, camera mount 310 may correspond to a head mount or other capture apparatus to capture the viewing angle of an operator. Instructions or commands may be relayed to robot unit 302 causing camera mount 310 to move in a corresponding manner to match the viewing angle of the operator. To enhance the operator experience, camera mount 310 may comprise a plurality of camera mount segments 312 that may be separated by motorized pivotable joints 314. The number and size of camera mount segments and pivotable joints 314 may vary depending on the embodiments and application of robot unit. Generally, in response to an instruction or commands, one or more of the pivotable joints 314 may activate to rotate or move camera mount 310. In some embodiments, the pivotable joints 314 may be used to move camera mount 310 in the X-axis, Y-axis, Z-axis as well as control the roll, pitch, and yaw of the camera mount 310. Accordingly, through movement in the 6 DOF, camera mount 310 may mimic or replicate the viewing angle of the operator. As further depicted in FIG. 3, a distal end of camera mount 310 may further comprise a sensory capture device. In some embodiments, the sensory capture device generally comprises at least one camera, three-dimensional camera, and/or sensor for capturing sensory information.

As described above, robot unit 302 may be adapted for performing repair work, maintenance work, or other similarly situation tasks or actions. To perform these actions, robot unit 302 may comprise at least one utility arm. The depicted embodiment as illustrated in FIG. 3 illustrates an exemplary embodiment of robot unit 302 comprising two utility arms 330a, 330b. Like camera mount 310 as described above, each of utility arms 330a, 330b may comprise a plurality of utility arm segments 332 that may be separate by motorized pivotable joints 334. The number and size of utility mount segments 332 and pivotable joints 334 may vary on the embodiments and application of robot unit. Generally, in response to an instruction or commands, one or more of the pivotable joints 334 may activate to rotate or move utility arms 330a, 330b. In some embodiments, the pivotable joints 334 may be used to move utility arms 330a, 330b in the X-axis, Y-axis, Z-axis as well as control the roll, pitch, and yaw of the camera mount 310. Accordingly, through movement in the 6 DOF, each utility arm 330a, 330b may mimic or replicate the movement of an operator's arms and hands. In some embodiments, the distal ends 336 of utility arms 330a, 330b may comprise one or more tools, flanges, or other apparatus for performing an action such as repair work. In some embodiments, distal ends 336 may comprise an adapter or may be otherwise configured for accepting a tool.

Remote assembly system 300 may further comprise a remote power source 350. In some embodiments, the remote power source 350 may be secured to the base. In further embodiments, remote power source 350 may be located within central hub 304. The remote power source 350 may be used to power camera mount 310, utility arm 330a, utility arm 330b, or any combination thereof. Remote power source 350 may be an electric generator, batteries, or any other known power source.

In further embodiments, robot unit 302 may comprise one or more additional capture devices or sensors 360 for capturing additional information that may be analyzed and/or presented to a user or operator in addition to the sensors 410 as described below. For example, in some embodiments, robot unit 302 may comprise a thermometer or heat sensor for capturing heat information. In some embodiments, robot unit 302 may comprise an electrical sensor for capturing electrical data. For example, robot unit 302 may be used to work on power lines or in other scenarios involving live power lines or other electrically charged wires or circuitry. accordingly, to avoid damage to the robot unit 302, the boom assembly 104, or the utility vehicle 102, at least one sensor 360 may be a sensor for detecting an electrical current. Additionally, robot unit 302 may comprise at least one sensor 360 that is at least one of an accelerometer, gyroscope, light sensor, or other sensor for detecting the positioning of camera mount 310, utility arm 330a, and/or utility arm 330b. As described in greater detail below, a sensor for detecting the positioning of robot unit 302 may aid in replicating or mimicking movement of an operator using motion controls.

In some embodiments, and as depicted in FIG. 3, in addition to robot unit 302, boom assembly and remote assembly system 300 may further comprise at least one heavy utility arm 390 or additional robotics assembly that may operate separately or in conjunction with robot unit 302. For example, in many robotics applications, a delicate balance is often considered when designing the features and capabilities of a robot. Typically, robotics adapted and configured for delicate work and fine adjustments are typically not capable of transporting or holding heavy loads. Conversely, robotics adapted and configured for holding or transporting heavy loads typically lack the structural components to perform delicate or fine-tuned actions. By way of non-limiting example, in telecommunication repairs, heavy parts may need to be lifted from the ground to a telecommunication pole. Lifting a heavy part may require a robotics configured for transporting heavy loads. However, once in position, the part may need a robotics configured for delicate or sophisticated operations to install the part in position. Embodiments of the present disclosure solve this dilemma by pairing a robotics configured and adapted for fine tuning and/or delicate work with a robotics configured and adapted for load bearing or transporting heavy loads. For example, in some embodiments, robot unit 302 may be configured and adapted for performing movements or actions directed to sophisticated, delicate, or fine-tuning work, such as unthreading wire, cutting wire, loosening screws and bolts. In some embodiments, remote assembly system 300 may comprise heavy utility arm 390 for holding or transporting heavy loads that may be too heavy for robot unit 302 to safely hold and transport. Accordingly, through the combination of robot unit 302 and heavy utility arm 390, remote assembly system 300 may perform both dexterous actions and load-bearing actions.

Generally, the term "manipulator" or "manipulators" used in embodiments herein, may comprise heavy utility arm 390, first robotic arm 424 and a second robotic arm 428, boom assembly 104, or any other articulated arm that may be used to manipulate components of the aerial device 100 or objects for performing work.

Figure 4:
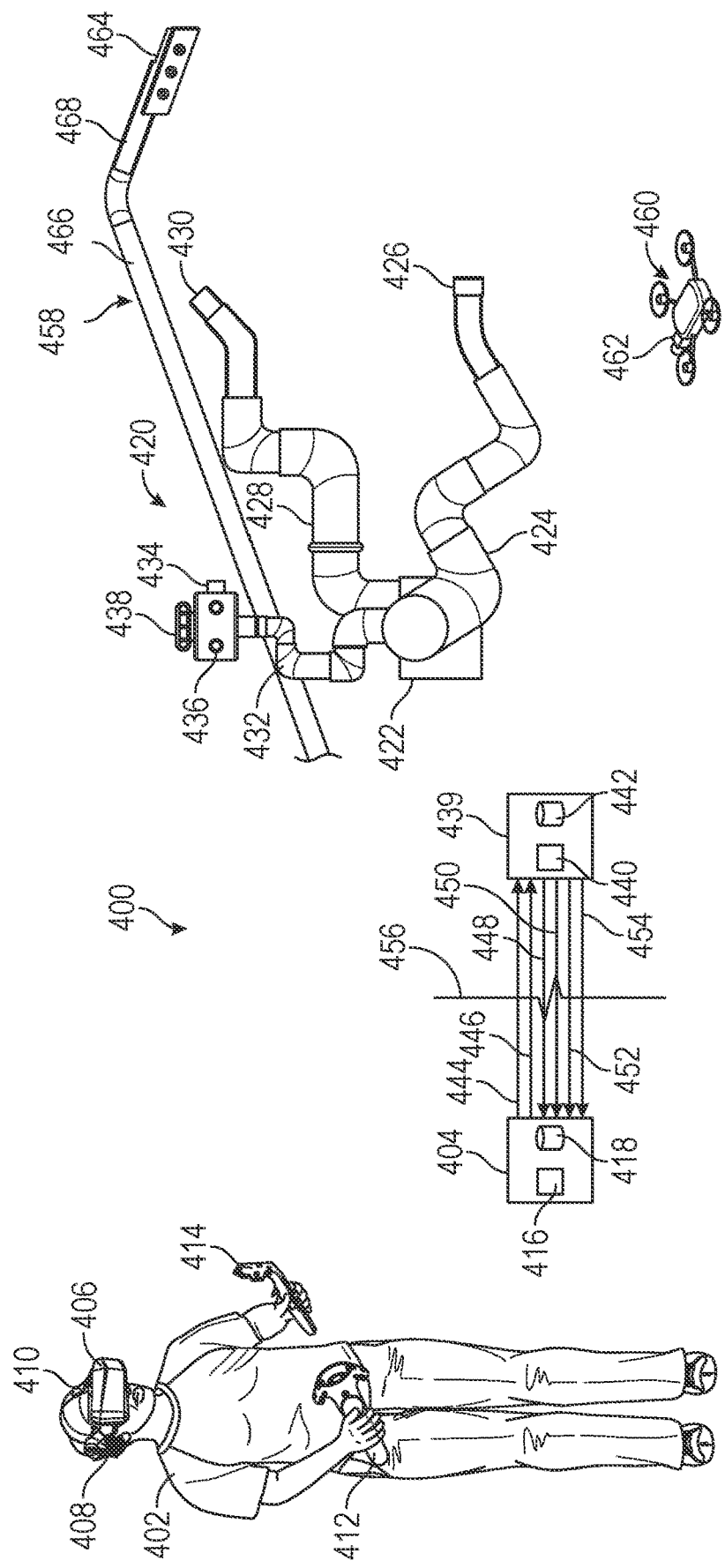
FIG. 4 depicts an exemplary remote operation system relating to some embodiments.

FIG. 4 depicts an exemplary remote operation system 400 relating to some embodiments. In some such embodiments, an operator 402 may be equipped with at least one user device 404. In some embodiments, the user device 404 comprises a computer or other computing device. The user device 404 may comprise or be associated with a head-mounted display such as a virtual reality headset or the like. In some embodiments, the user device 404 includes or interfaces with at least one display 406 and one or more speakers 408, as shown. For example, the display 406 may be disposed on a front of the headset and the speakers 408 may be positioned on either side of the headset such that stereophonic audio may be provided. Additionally, in some embodiments, the user device 404 may include head mounted sensor 410 disposed on or in the user device 404. For example, in some embodiments, the at least one sensor 410 may include any combination of accelerometers, gyroscopes, or angular position sensors for measuring an angle or change in angular position of the user device 404.

In some embodiments, the user device 404 may further include one or more controllers such as a first position sensitive controller 412 and a second position sensitive controller 414, as shown. In some embodiments, each of the first position sensitive controller 412 and the second position sensitive controller 414 may be configured to be held in the hands of the operator 402 for reading the position of the hands of the operator 402. In some such embodiments, the first position sensitive controller 412 and the second position sensitive controller 414 may incorporate one or more position sensitive sensors, such as any of accelerometers, gyroscopes, potentiometers, load cells, as well as other sensors suitable to measure the position and angular position of the hands of the operator 402. In some embodiments, the user device 404 comprises any number of joysticks such as any combination of single-axis or multi-axis joysticks. For example, one or more 3-axis joysticks or 6-axis joysticks may be used to control motion of either of the robotic assembly 420 or the boom assembly 104. In some embodiments, a 6-axis joystick may be used to control motion in six degrees of freedom. For example, in some embodiments, the position sensitive controllers 412 and 414 may include a 6-axis joystick or other multi-axis control means.

In some embodiments, the user device 404 interfaces with or includes at least one processor 416 and at least one data storage 418. For example, in some embodiments, the processor 416 and data storage 418 may be internally or externally included on the user device 404. Additionally, embodiments are contemplated in which the processor 416 and data storage 418 may be included externally on another device that interfaces with the user device 404. For example, an external computer may interface with the user device 404 via either of a wired or wireless connection.

In some embodiments, the remote operation system 400 includes a robotic assembly 420, as shown, that may interface with the user device 404. In some embodiments, the robotic assembly 420 comprises a base 422, as shown. In some embodiments, the robotic assembly 420 may be disposed at the distal end 122 in place of or in addition to a utility platform. For example, in some embodiments, the base 422 of the robotic assembly 420 may be pivotably secured to a boom tip of the boom assembly 104. The robotic assembly 420 may include one or more robotic arms. For example, in some embodiments, the robotic assembly 420 comprises a first robotic arm 424 including a first robotic arm end 426 and a second robotic arm 428 including a second robotic arm end 430, as shown. Embodiments are contemplated in which the robotic arms 424 and 428 include any number of sensors (e.g., at least one sensor 290) for measuring the position and angle of one or more joints within each robotic arm. Accordingly, information may be monitored related to the position and orientation of the robotic arms in 3-dimensional space.

Additionally, in some embodiments, the robotic assembly 420 comprises a camera robotic arm 432 including one or more cameras 434 and one or more microphones 436 disposed at an end of the camera robotic arm 432. In some embodiments, two or more cameras may be included to provide stereoscopic vision, which may improve visual depth. Similarly, two or more microphones 436 may be included to provide stereophonic audio. In some embodiments, the cameras 434 and the microphones 436 may be configured to continuously capture video data and audio data respectively. Further, in some embodiments, the camera robotic arm 432 is configured to rotate and/or pivot about one or more joints to adjust the positioning and angle of the cameras 434 and the microphones 436.

In some embodiments, the robotic assembly 420 includes a depth sensor 438 disposed, for example, at the end of the camera robotic arm 432, as shown. The depth sensor 438 may be configured to collect 3-dimensional range information in proximity to the robotic assembly 420. In some such embodiments, the depth sensor 438 is operable to collect a 3-dimensional scan of a work area associated with the robotic assembly 420. Additionally, in some embodiments, the depth sensor 438 collects information relating to the positioning of the robotic arms. Further, in some embodiments, the depth sensor 438 may be used for object identification, for example, to prevent unintentional collisions of the robotic assembly 420 with foreign objects. In some embodiments, the depth sensor 438 may be a lidar sensor or other type of depth sensor. Further still, embodiments are contemplated in which a plurality of depth sensors 438 may be included. For example, an array of lidar sensors may be disposed around the robotic assembly 420 to capture a 3-dimensional scan of the work area. Additionally, in some embodiments, both of a front facing lidar sensor and a rear facing lidar sensor may be included to generate a 3-dimensional scan of the areas ahead of and behind the robotic assembly 420 respectively.

In some embodiments, the robotic assembly 420 interfaces with or includes a computing device 439 such as a computer or controller. In some embodiments, computing device 439 may be controller 224, computer 260, or control system 280 in the case of a local control system. The computing device 439 may include at least one processor 440 and at least one data storage 442, as shown. For example, in some embodiments, the computing device 439 may be included internally or externally on the robotic assembly 420. Additionally, embodiments are contemplated in which the computing device 439 may be included as an external computing device interfaced with the robotic assembly 420. Such an external computing device may be disposed, for example, in the vicinity of the robotic assembly 420 or elsewhere such as near the user device 404. Accordingly, embodiments are contemplated in which signal processing takes place at the robotic assembly 420, at the user device 404, or any combination thereof.

In some embodiments, a bidirectional communication connection may be established between the user device 404 and the robotic assembly 420. In some embodiments, the robotic assembly 420 and the user device 404 may be communicatively coupled via any of a non-electric wired connection such as a fiber optic cable, or a wireless connection such as a wireless network connection or Bluetooth connection. Embodiments are contemplated in which an electrical wired connection may be used such as a traditional electrical cable, however, it may be unsafe to use an electrical communication connection while the aerial device is electrically bonded to an energized power line. As such, in some embodiments, in which electrical bonding is used, alternative communication connections are used. In some embodiments, a plurality of data signals may be transmitted from the user device 404 to the robotic assembly 420 and vice versa. For example, in some embodiments, a controller signal 444 including information indicative of the position and orientation of the first position sensitive controller 412 and/or the second position sensitive controller 414 may be transmitted from the user device 404 to the robotic assembly 420. Similarly, a sensor signal 446 including information indicative of the position and orientation of the at least one sensor 410 may be transmitted from the user device 404 to the robotic assembly 420.

Additionally, in some embodiments, data signals may be transmitted from the robotic assembly 420 to the user device 404. For example, a video data 448 including images captured by the cameras 434 may be transmitted from the robotic assembly 420 to the user device 404. Similarly, audio data 450 including audio captured by the microphones 436 may be transmitted from the robotic assembly 420 to the user device 404. Further, in some embodiments, scan data 452 including information indicative of the 3-dimensional data and/or distance data captured by the depth sensor 438 may be transmitted from the robotic assembly 420 to the user device 404. In some embodiments, computer-vision techniques may be applied to the image data and/or the depth data, for example, to identify one or more objects within the work area of the remotely operated equipment.

In some embodiments, a feedback signal 454 may be transmitted from the robotic assembly 420 to the user device 404. In some such embodiments, the feedback signal 454 may include haptic feedback or some other notification from the robotic assembly 420. For example, in some embodiments, the feedback signal 454 may include instructions to cause either of the first position sensitive controller 412 or the second position sensitive controller 414 to vibrate or generate force feedback for the operator 402 responsive to a collision or a potential collision condition. Further still, embodiments are contemplated in which the feedback signal 454 causes any of vibration or force feedback within the first position sensitive controller 412 and/or second position sensitive controller 414, audible feedback within the one or more speakers 408 such as a ringing alarm, visual feedback within the least one display 406 such as a flashing light, or any combination thereof. In some embodiments, the feedback signal 454 may be transmitted based on one or more triggers. For example, a trigger may be generated when the robotic assembly 420 is approaching a collision or a singularity. In some embodiments, any of the data signals described above may be submitted in real-time. For example, the video data 448 and the audio data 450 may be continuously provided from the robotic assembly 420 such that the image data captured by the cameras 434 is displayed on the display 406 in real-time with minimal latency.

In some embodiments, one or more of the signals described herein may be transmitted across a dielectric gap 456. In some embodiments, the user device 404 may be disposed at a remote location with a different voltage potential from that of the robotic assembly 420. For example, the robotic assembly 420 may be electrically bonded to an energized power line for performing work on or in the vicinity of the energized power line. Accordingly, the robotic assembly 420 is held at a similar electrical potential as the energized power line and is insulated from coming into contact with ground potential. Accordingly, in some embodiments, traditional electrical communication techniques may be avoided to prevent electric shock. As such, embodiments are contemplated in which a fiber optic cable or wireless connection are used for communication with the robotic assembly 420 to prevent electrical signals at ground potential from reaching the robotic assembly 420.

In some embodiments, at least one drone 460 may be included. For example, drones or other autonomous vehicles may be positioned around the work area of the robotic assembly 420. In some such embodiments, the drone 460 may include at least one drove sensor 462 such as a camera or lidar sensor for capturing additional information about the work area. In some embodiments, the at least one drone sensor 462 comprises any combination of one or more cameras and one or more lidar sensors. For example, in some embodiments, a drone 460 may hover around a back side of a utility pole to capture additional image data that is not otherwise visible to the robotic assembly. Additionally, in some embodiments, the drone 460 may include a lidar sensor for capturing 3-dimensional data of the work area. In some embodiments, the drone 460 may communicate with any of the robotic assembly 420 or the user device 404 via wired or wireless communication. In some embodiments, image data captured by the drone 460 may be transmitted to the user device 404.

In some embodiments, the robotic arms 424 and 428 may be configured to move based on the motion of the position sensitive controllers 412 and 414. For example, in some embodiments, the end of each robotic arm is positioned relative to the position of the position sensitive controllers such that the first robotic arm end 426 is positioned based on the position of the first position sensitive controller 412 and the second robotic arm end 430 is positioned based on the position of the second position sensitive controller 414. Accordingly, if the operator 402 moves the first position sensitive controller 412 upwards the first robotic arm 424 will automatically be adjusted such that the first robotic arm end 426 is also moved upwards. In some embodiments, the robotic arms may be adjusted by pivoting about one or more joints disposed within the robotic arms. Similarly, in some embodiments, the camera robotic arm 432 may be moved such that the camera 434 disposed at the end of the camera robotic arm 432 is positioned based on the position of the headset of the user device 404. For example, as the operator 402 moves and tilts their head, the camera robotic arm 432 will be moved and tilted such that the position of the cameras 434 matches the position of the operator's eyes.

In some embodiments, the position of the robotic assembly 420 may be shifted relative to the position of the operator 402. For example, in some embodiments, the operator 402 may temporarily freeze motion of the robotic assembly 420 to reset a home position of the robotic assembly 420. Accordingly, the operator 402 may pause the robotic assembly 420 preventing unintended motion and locking the robotic assembly 420 in place, move their arms into a more comfortable position, and then resume operation, for example, by submitting a subsequent resume input, and continue to control motion of the robotic assembly 420 from a more comfortable position. Here, the operator 402 may position their arms comfortably at a low position while the robotic arms 424 and 428 are raised upwards rather than having to hold their arms at an uncomfortably raised position for an extended period of time. Further, embodiments are contemplated in which the operator 402 controls motion of the robotic assembly 420 from a sitting position in a remote location, such as in an office chair, in a vehicle seat, or in another location remote from the robotic assembly 420. In some embodiments, requests to pause and resume motion of the robotic assembly may be received as operator inputs, for example, via the user device 404 such as through one or more buttons on the controllers 412 and/or 414.

Embodiments are discussed above in which the operator actively selects an input to pause and resume the motion control. However, it should be understood that further embodiments are contemplated in which an input such as the operator 402 pressing a button on the position sensitive controllers 412 and 414 may be used to initiate movement of the robotic assembly 420. Accordingly, in some such embodiments, the robotic assembly 420 will only move while the button is held on the respective controller. Accordingly, the operator 402 can shift the position of the motion controls by letting go of said button and moving the controllers into the desired position.

It should be understood that, in some embodiments, a variety of processing options are contemplated. For example, in some embodiments, a first processing stage may occur at or on the robotic assembly 420 such as by the processor 440 and a second processing stage may occur at the user device 404 such as by the processor 416. Here, various processing techniques may be applied to the collected signals. For example, data filtering and smoothing algorithms may be employed by the processor 440 of the robotic assembly 420 to smooth the data signals transmitted to the user device 404. Further, in some embodiments, portions of the data collected by the robotic assembly 420 may be stored within the data storage 442. Additionally, or alternatively, data processing and storage may occur at the user device 404. For example, raw data received from the robotic assembly 420 may be filtered and transformed using the processor 416 of the user device 404.

In some embodiments, the robotic assembly 420 may be disposed on the boom assembly 104. For example, the robotic assembly 420 may be included at the distal end of the boom at a boom tip of the boom assembly 104. In some embodiments, the robotic assembly 420 may be included in place of or in addition to the utility platform. Additionally, embodiments are contemplated in which the robotic assembly 420 may be attached to other devices such as directly onto the utility vehicle 102 or onto another suitable device not explicitly described herein. Further, in some embodiments, the robotic assembly 420 may be included as a stand-alone device.

Embodiments are contemplated in which at least a portion of the remote operation system 400 described above may be employed for controlling the motion of the boom assembly 104 of FIG. 1. For example, the joints of the boom assembly 104 may be rotated and adjusted to match the boom tip with a specified position of velocity requested by the operator 402. For example, the operator 402 may control the motion of the boom assembly 104 using the first position sensitive controller 412 such that position changes of the first position sensitive controller 412 are repeated by the boom tip. It should be understood that the position changes may not be to scale, and a scaling factor may be used to translate controller movements to boom tip movements. For example, a movement of about 3 inches of the first position sensitive controller 412 may be converted to a movement of about 18 inches of the boom tip with a scaling factor of 6.0. However, it should be understood that other scaling factors may be used, and in some embodiments, an operator may select and adjust the scaling factor during operation. Further still, in some embodiments, the scaling factor may be set automatically based on a type of operation being performed by the boom assembly 104 and/or the robotic assembly 420.

Embodiments are contemplated in which both the robotic assembly 420 and the boom assembly 104 may be remotely controlled by one or more operators. Here, the robotic assembly 420 and the boom assembly 104 may be controlled simultaneously using separate input devices or using separate portions of the same input device. Additionally, in some embodiments, the operator may be able to switch modes of a single input device to selectable switch between control of the robotic assembly 420 and the boom assembly 104. For example, an operator may select between a robot control mode, a boom control mode, or other suitable operational control modes. For example, in some embodiments, a plurality of robotic assemblies may be included such that the operator 402 may switch between modes for controlling each respective robotic assembly.

In some embodiments, camera rod 458 comprising first rod section 466 and second rod section 468 connected by an angle, and camera rod camera 464 may be coupled to robot unit 302 or disposed on base 150 adjacent robot unit 302. Camera rod camera 464 may be a visual light, infrared, depth, Lidar, or any other type of camera. Camera rod camera 464 may obtain an image or video of the operational environment of robot unit 302. The operation environment may comprise any area that robot unit 302 or any other associated manipulators may perform work. Rod 458 may be extended by an actuator controlled by computing device 439 or by the operator to extend to a back side of any object in the operational environment. Rod 458 may be extended, and in some embodiments, rod 458 may comprise joints and actuators to move around the working objects to image all sides of working objects. This provides a full 360-degree view of the operational environment and any components therein.

Figure 6:
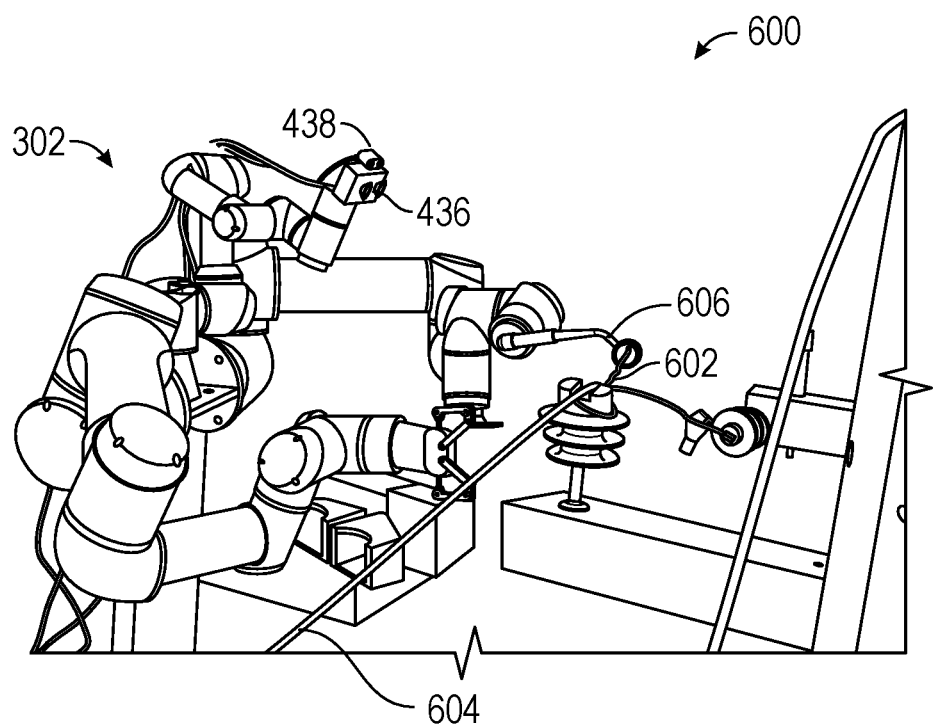
FIG. 6 depicts an embodiment of the robot unit performing a task.
Figure 7:
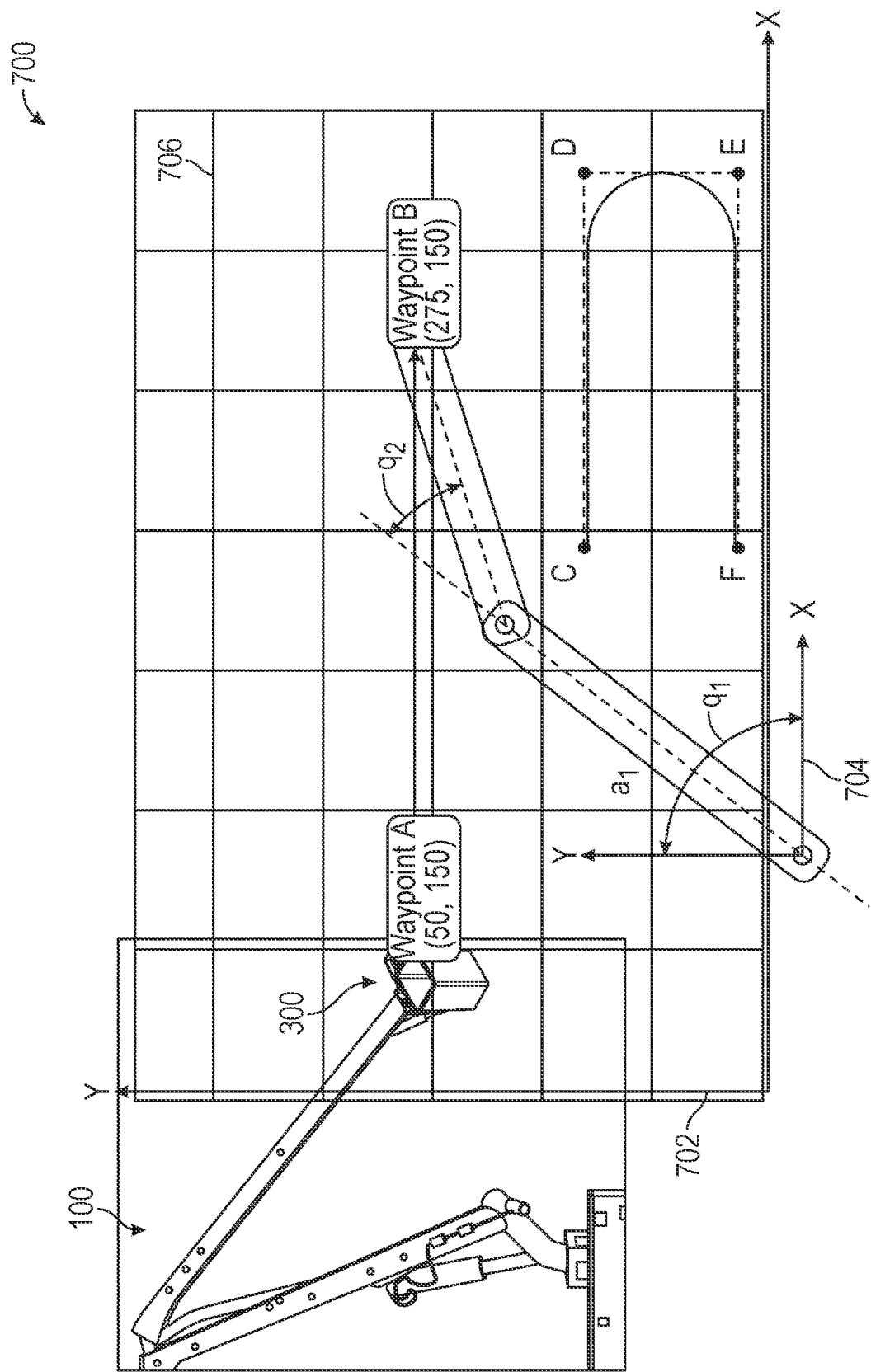
FIG. 7 depicts an embodiment of an aerial device moving a boom implement between locations.

In some embodiments, images from cameras 434, depth sensor 438, and camera rod camera 464 may be used to generate a three-dimensional operational model representative of the operational environment 600 (FIG. 6). The operation model may comprise object locations in an inertial coordinate system 702 (FIG. 7). This concept is discussed in more detail below and in FIG. 7.

In some embodiments, drone 460 may comprise a camera that may be a visual light, infrared, depth, Lidar, or any other type of camera. Drone 460 may be flown around the operational environment of the remote assembly system 300 imaging the operational environment. Drone 460 may be controlled by an operator on the ground or at a remote location. In some embodiments, drone 460 may be controlled by hand controls 412, 414, or by any other controller. In some embodiments, drone 460 may be autonomous and may fly a pre-defined flight path around the operational environment collecting images necessary to generate the three-dimensional operational model of the operational environment.

Figure 5:
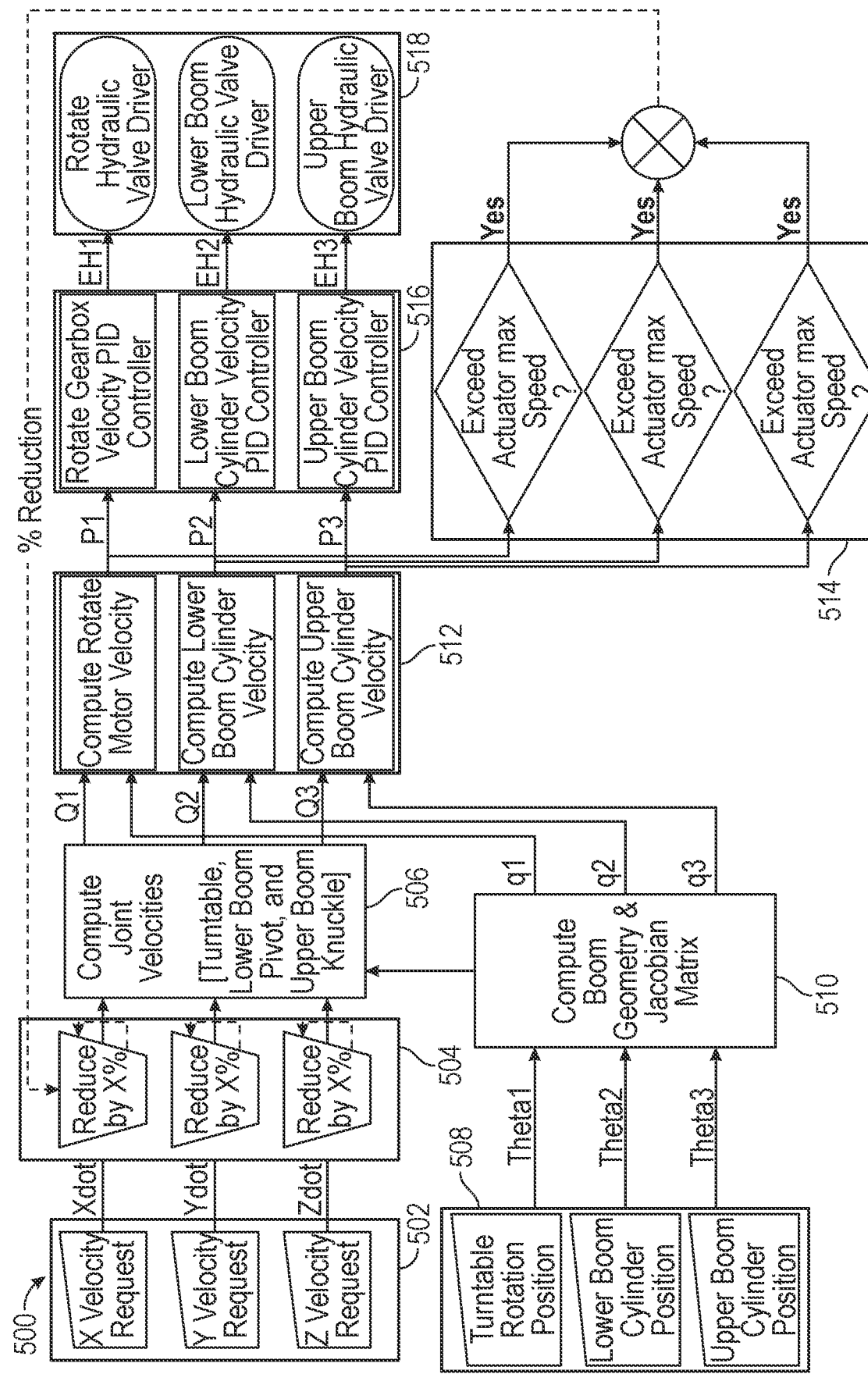
FIG. 5 depicts an exemplary flow diagram for driving boom operations relating to some embodiments.

FIG. 5 depicts an exemplary flow diagram 500 for driving manual boom operation relating to some embodiments. In some embodiments, at an operator input stage 502 one or more operator inputs are received for each of three cartesian coordinate directions. For example, a velocity input value may be received for each of the X-direction, Y-direction, and Z-direction. Additionally, embodiments are contemplated in which velocities may be input and computed for any number of directions. Further still, in some embodiments, velocities may be included for any combination of linear directions and rotational axis. For example, in some embodiments, inputs may be received for a motion control system having six degrees of freedom. In some such embodiments, the operator inputs may be requested by an operator via an input device such as a joystick or other controller. In some embodiments, a saturation reduction stage 504 may be included in which a percentage reduction is received to reduce the requested velocity values if at least one of the requested values is saturated, as will be described in further detail below. Accordingly, the speed associated with the motion path may be monitored and if the speed exceeds a predetermined threshold the speed may be reduced for each of the three cartesian directions.

In some embodiments, a joint velocity computation stage 506 may be included in which a joint velocity is computed for each joint of the boom assembly 104 is based on the requested velocity values and a Jacobian matrix for the boom assembly 104. For example, a joint velocity may be computed for each of the turntable 106, the lower boom cylinder 114, and the upper boom cylinder 116. In some embodiments, the joint velocity computation stage 506 provides a motion path for the boom assembly 104 including a plurality of joint velocities to achieve the requested Cartesian velocities at a predetermined point on the boom assembly 104. For example, in some embodiments, the motion path may be generated to achieve a specific velocity vector or position vector of the boom tip.

Further, in some embodiments, a feedback sensor input stage 508 may be included for receiving one or more position inputs indicative of a measured current position of the boom assembly 104. In some embodiments, the position inputs may be received from one or more sensors disposed within the joints of the boom assembly 104. For example, any of a rotary encoder, linear potentiometer, angular potentiometer, gyroscope, other position sensitive sensor (angular or linear), or combinations thereof may be incorporated into the joints of the boom assembly 104 including the turntable 106, the lower boom cylinder 114, and the upper boom cylinder 116. In some embodiments, one or more extension sensors may be included for measuring the extension of the boom cylinders. For example, in some embodiments, one or more string potentiometers may be included internally within the one or more cylinders of the boom assembly 104 for measuring an extension of the respective cylinder. In some embodiments, other types of extension measurement devices may be used such as, magnetostrictive sensors or hall-effect sensors. In some embodiments, magnetostrictive sensors may be utilized in high performance applications. Similarly, in some embodiments, one or more rotary encoders may be disposed on the boom assembly 104 for measuring an angle of rotation of respective joints of the boom assembly 104.

In some embodiments, a boom geometry computation stage 510 may be included for computing the boom geometry and Jacobian matrix based on the received position inputs from the feedback sensor input stage 508 and known dimensions and geometries of the boom assembly 104. In some embodiments, a plurality of predetermined parameters may be received prior to operation indicating the dimensions of the boom sections. In some embodiments, the Jacobian matrix may be generated by taking the partial derivative of the position inputs. The Jacobian matrix may then be provided to the joint velocity computation stage 506 for computing individual joint velocities. In some embodiments, an actuator velocity conversion stage 512 may be included for converting the joint velocities of the joint velocity computation stage 506 into actuator velocities based on the geometry of the boom assembly 104 and specific linkages associated with each joint. Accordingly, in some embodiments, the boom geometry computed at the boom geometry computation stage 510 may be provided to the actuator velocity conversion stage 512. Additionally, embodiments are contemplated in which matrix calculations may be performed ahead of time and results including a plurality of reference values may be stored in a look-up table or other storage structure. In some such embodiments, the real time parameters may be used to approximate between reference values in the look-up table. Accordingly, the processing burden may be reduced during real-time operation such that control latency is further reduced.

In some embodiments, a saturation check stage 514 may be included for limiting the X, Y, Z direction velocity input values based on the physical flow limits of the boom assembly 104. For example, the boom assembly 104 may be at least partially hydraulically actuated such that each hydraulic actuator is associated with a physical flow limit. Further, the sum of all actuators may saturate the flow beyond what a hydraulic pump of the boom assembly is able to produce. Accordingly, the saturation check stage 514 may determine whether any of the actuator limits have been exceeded by the currently requested velocities and if at least one of the physical flow limits is exceeded, a percentage reduction may be applied at the saturation reduction stage 504. In some such embodiments, a percentage value for the reduction may be calculated such that X, Y, and Z velocity inputs are reduced by the same amount until the flow limits are within the limits of the actuators. Alternatively, in some embodiments, a predetermined reduction value may be used. For example, each of the velocities may be reduced by 1%, 50%, or another suitable percentage. In both cases, the reduction in X, Y, Z velocities are the same for each in order to maintain the path accuracy. Conversely, if none of the flow limits are exceeded the percentage reduction is not applied at the saturation reduction stage 504 or a percentage reduction of 0% may be applied.

In some embodiments, a valve command controller stage 516 may be included. Here, a valve command is generated for each of the actuator velocities of the actuator velocity conversion stage 512. In some embodiments, one or more PID controllers may be included for a plurality of hydraulic valves of the boom assembly 104. Accordingly, the PID controllers may be configured to receive a signal indicative of the requested actuator velocities and generate valve commands respectively. In some embodiments, an output valve command stage 518 may be included in which the valve commands are transmitted to the hydraulic valve drivers for adjusting the hydraulic valves to achieve the requested velocities. In some embodiments, the hydraulic valves may be electrically actuated such that the valve commands are received as electrical signals and each valve is operated based on the respective electrical signal. In some embodiments, a hydraulic valve may be included in the boom assembly 104 corresponding to each joint of the boom assembly 104. In some embodiments, the valves may be disposed at each joint. Alternatively, in some embodiments, the valves may be included in a common location such as on a hydraulic manifold disposed at the turntable 106. For example, a rotate hydraulic valve may be disposed in or adjacent to the turntable 106, a lower boom hydraulic valve may be disposed in or adjacent to the lower boom cylinder 114, and an upper boom hydraulic valve may be disposed in or adjacent to the upper boom cylinder 116. In some embodiments, the motion path may be realized by adjusting the extension of the various hydraulic cylinders of the boom assembly 104.

In some embodiments, an extension of one or more telescoping sections of the boom assembly may controlled in a similar fashion as described above. For example, the extension length of the telescoping section may be retracted or extended based on a received movement request from the operator. Typically, movements such as boom extension are controlled separately from other movement of the boom assembly. However, embodiments are contemplated in which the extension of the telescoping section may be adjusted in unison along with other movements of the boom assembly. For example, an operator may request an upward movement of the boom tip and the telescoping section may be extended upward while the hydraulic cylinders are simultaneously adjusted in response to the requested movement. In some embodiments, a machine architecture is provided including four actuators, for example, the boom assembly 104 including the turntable 106, the lower boom cylinder 114, and the upper boom cylinder 116, as well as a telescoping section of the boom as a fourth actuator. In some embodiments, to account for a fourth actuator in a three degrees of freedom motion system any of a maximizing stability parameter, a stationary pose parameter, or a maximizing capacity parameter may be used to add an additional constraint to dictate a solution of the fourth actuator. In some embodiments, similar approaches may be applied for systems with any number of actuators, for example, in a system having seven actuators and six degrees of freedom.

Further, embodiments are contemplated in which additional parameters may be considered while calculating the motion path. For example, in some embodiments, a current payout length of a winch line disposed on the boom assembly 104 may be considered. Here, the payout length may be monitored such that the winch line is not extended past a maximum available length to avoid two-blocking and potential damage. Two-blocking may refer to a condition in which a lower load comes in contact with a higher load leading to substantially large forces applied to the boom assembly 104. Accordingly, embodiments are contemplated in which the motion path may be adjusted based on the payout length of the winch line to prevent a two-blocking condition of the boom assembly 104.

In some embodiments, the process flow described above with reference to FIG. 4 may be used to simplify the controls that the operator has to provide to move the boom. Here, the operator may only provide an indication of the velocities with which the boom tip should be moved instead of individually controlling each joint of the boom assembly 104. Accordingly, a more simplified and intuitive means of collecting operator inputs is provided such that the operators do not need to be capable of providing complex individual boom movements and these movements will be automatically worked out within the motion processing system. Additionally, it should be understood that, in some embodiments, the process described above for driving manual boom operation may also be applied to controlling operation of the robotics assembly 420. For example, a similar process flow may be carried out to control the rotation of the joints within the robotic arms 424 and 428.

It should be understood that a number of different motion paths may be present for a given target position. Accordingly, in some embodiments, various optimizations to the generated motion path may be applied. Here, various adjustments to the motion path may be implemented, for example, based on any of obstacles, singularities, types of work operations, and other factors. In some embodiments, the motion path may be optimized to provide maximized structural strength to the boom assembly 104. Additionally, in some embodiments, the motion path may be optimized for energy conservation. For example, the shortest collective motion path to a destination position for all of the joints may be chosen. Further still, motion paths may be selected based on avoiding collisions and singularities of the boom assembly 104 or the robotic assembly 420.

In some embodiments, the motion path may be calculated using a closed-form inverse kinematics function. Here, the closed-form inverse kinematics provide a significantly faster approach to generating a motion path as compared to open form calculates that typically rely on guess and check methods to converge onto a solution, which consumes large amounts of time and generates substantial input latency. The closed-form inverse kinematics may use predetermined mathematical parameters for the equipment that factor in the geometries and dimensions of the equipment such as the length of one or more members of the robotic arms and the sections of the boom assembly 104. Accordingly, the lengths of the members of the equipment may be automatically accounted for and worked out ahead of time to thereby simplify the real-time calculations that are performed during operation. In some embodiments, the predetermined parameters of the remotely operated equipment allow a closed-form technique to be used that receives one or more inputs and generates one or more outputs without requiring guess and check or repeated iterations to provide a solution.

In some embodiments, the motion path may be determined for a suspended load, for example, disposed at the boom tip. In some such embodiments, a suspended load may be held at the boom tip on or in place of the utility platform. For example, in some embodiments, a utility pole or other object may be gripped and supported at the distal end of the boom. Accordingly, the control inputs may be received requesting to execute motion of the suspended load. Accordingly, the operator can intuitively control the positioning and orientation of the suspended load.

In some embodiments, various forms of load monitoring may be applied to monitor one or more loads of the boom assembly 104 or of the robotic assembly 420. Accordingly, in some embodiments, haptic feedback and/or other forms of feedback may be generated in response to a detected load. A feedback response may include any combination of haptic feedback such as vibration of a controller or other user device, visual feedback such as a flashing light, or audible feedback such as a ringing alarm. In some embodiments, an intensity or frequency of the feedback may be determined proportional to the load. For example, a less intense feedback response may be generated for a load of 200 pounds as compared to a load of 500 pounds.

Further, in some embodiments, the intensity (or frequency) of the feedback response may be selected granularly based on a comparison of a measured load to a predetermined maximum load value such that the intensity increases as the measured load approaches the maximum load value. In some embodiments, the intensity and/or frequency may vary according to an exponential function such that load changes at higher loads closer to the maximum load value are more noticeable to the operator. In some embodiments, linear functions and other types of feedback functions are also contemplated. In some embodiments, the intensity and/or frequency of the feedback response may become saturated after a certain load value is exceeded. For example, in some embodiments, the feedback response may become saturated when the maximum load value is exceeded such that the feedback response is similar at and above the maximum load.

In some embodiments, the feedback response may be communicated such that the operator is notified without looking away from the work area or losing focus. For example, any of vibration, lights, or an audible alarm may be activated within controllers 412 and 414, display 406, and speakers 408, respectively.

Additionally, embodiments are contemplated in which the velocities of the boom cylinders and the motion path may be automatically adjusted based on one or more measured loads. For example, if a heavy load of 400 pounds is suspended at the boom tip the velocities of the valve commands may be automatically increased such that the boom assembly 104 moves at a similar speed as if there was no load suspended at the boom tip. Alternatively, in some embodiments, the valve commands may not be increased based on a measured load such that the boom assembly moves slower while supporting a heavy load to ensure additional caution. Further, in some embodiments, pressure-compensated hydraulic valves may be used such that the motion speeds are independent of varying load amounts. Further still, embodiments are contemplated in which allowed accelerations of the boom assembly are limited based on a sensed load to thereby minimize dynamic loading conditions and shock loading on the structures of the boom assembly 104. For example, if a heavy load of 400 pounds is being supported at the boom tip, an acceleration limit may be reduced based on the 400 pounds of additional weight to prevent dynamic loading affects and shock associated with quickly accelerating a large load.

FIG. 6 depicts an exemplary embodiment of robot unit 302 working in operational environment 600. As described above, the system of cameras (e.g., cameras 434) may take images of operational environment 600. In some embodiments, in a semi-autonomous mode, the images may be displayed to the user and the user may select objects and actions to be performed on the objects. As shown, tie wire 602 is being removed from a conductor 604. In this exemplary scenario, removing the tie wire 602 may be caused by stored computer-executable instructions and the user may simply select the operation to be performed. The user may select and label the objects. For example, the user may select tie wire 602 and label the object "tie wire" by typing in the label or selecting from a predefined list of components. When the labels and the operations have been defined by the user, robot unit 302 may access the executable-instructions associated with the operation and execute the task. Robot unit 302 may execute the task based on the above-described controls in FIGS. 3 and 5. In some embodiments, the task may be performed using a feedback controller detecting the location of tool (e.g., ring tool 606) through video imaging from the cameras 434 and the at least one sensor 290 (e.g., rotary encoders) positioned on the robot to detect a state of the robot or to further detect operational environment 600.

In some embodiments, the tool location may be tracked relative to inertial coordinate system 702. The tool location may be tracked by sensors (e.g., at least one sensor 290) in the tool (e.g., accelerometers, gyroscopes, GPS, and the like). Similarly, utility arms 330a, 330b may be tracked using rotary encoders and the like. The sensor data may be combined to provide an accurate location of the tool in inertial coordinate system 702. Furthermore, the environment model may be based on inertial coordinate system 702. Therefore, the locations of all tools and objects in operational environment 600 may be mapped to inertial coordinate system 702 such that the operational model may comprise all necessary information for robot unit 302 to perform the task. Robot unit 302 may assume, once the images are taken and the operation model are created, that no objects in the operational environment move. Accordingly, the robot unit may manipulate tie wire 602 according to an automated set of instructions.

In some embodiments, the operational model may be generated comprising assigned coordinates to the objects detected in the image. For example, in some embodiments, objects in operational environment 600 may be detected and categorized using machine learning algorithms such as a convolution neural network (CNN) trained for object detection and categorization. Furthermore, the algorithms for object detection may be trained on a relatively small set of objects. This may produce relatively quick recognition and categorization of objects to produce efficient response of robot unit and a short time to complete the tasks.

In some embodiments, the object recognition coupled with inertial coordinate system 702 and the operational model may be used to produce a fully autonomous robot unit 302. For example, as described above, the cameras 434, depth sensor 438, and camera rod camera 464 may be used to obtain images and/or video of operational environment 600. The objects (e.g., fasteners, crossbars, insulators, transformers, and conductors) in operation environment 600 may be recognized and categorized using object recognition and categorization algorithms. The object locations may be mapped to inertial coordinate system 702 generating the operation model. The operation model may then be used along with a task to be performed for the robot unit 302 to move into an initial (home) location and begin the automated task that may be controlled by a feedback loop including any sensors (i.e., sensor 290) providing the feedback. In some embodiments, the feedback may be provided by the camera system, rotary encoders, accelerometers, and any other sensor that may be used to cause awareness of operational environment 600 or the state of robot unit 302 while the task is being performed.

In some embodiments, the computer-executable instructions are based on the type of tool being used and the location of the reference point associated with the tool. Furthermore, specific instructions may be provided based on the geometry of the tool. For example, various sizes of wrenches or ring tools may be used. Accordingly, the instruction for using the tools may be slightly different to accommodate the different tools. Furthermore, the reference point marking the coordinates of the tool may be defined at different places. The reference point may be defined at the point where the tool is coupled to the utility arms 330*a*, 330*b* or may be defined at a point where the tool aligns with the object. Accordingly, the computer-executable instructions may be slightly different based on the reference point location. In some embodiments, a simple calculation may transform the reference location to a predefined position such that various instructions need not be stored.

In some embodiments, various tasks may be performed by robot unit 302 in semi-autonomous and fully autonomous modes. For example, robot unit 302 may store computer-executable instructions for automatically removing tie wire 602. Robot unit 302 may store the locations of the various objects in the operation model and start at a "home" location relative to tie wire 602. Robot unit 302 may then proceed to perform the tasks based on the object locations, feedback information from sensor 290, and the stored computer-executable instructions. In some embodiments, the stored computer-executable instructions may be access based on a stored mode of robot unit 302 that may be selected by the user. Robot unit 302 may be capable of autonomously and semi-autonomously removing and adding fasteners (i.e., bolts, screws, tie wires, and the like). Robot unit 302 may also be capable of autonomously and semi-autonomously adding, moving, repairing, and cleaning, capacitors, conductors, transformers, and the like. Any tasks that may be performed by workers may be performed by robot unit 302.

FIG. 7 depicts an exemplary autonomous or semi-autonomous mode of operation for aerial device 100. As illustrated, aerial device 100 is in operation extending remote assembly system 300 in a straight line along an x-axis in inertial coordinate system 700 comprising inertial grid 706. Boom coordinate system 704 (e.g., local coordinate system) may describe the elements and motion of boom assembly 104. In some embodiments, remote assembly 202 may be aware, or store, inertial coordinate system 702 and, in some embodiments, remote assembly 202 may not be aware of inertial coordinate system 702.

In some embodiments, inertial coordinate system 702 may be stored for operation by remote assembly 202. Inertial coordinate system 702 may be based on or associated with global coordinates such as GPS coordinates, or local coordinates described by local objects or short-range communication such as BLUETOOTH, WIFI, and/or radio frequency identification (RFID). In some embodiments, points in inertial coordinate system 702 (waypoints) may be provided.

Waypoint A may be a first position of remote assembly system 300 and waypoint B may be a second position of remote assembly system 300. In some embodiments, the user may input the waypoints as a starting point and an ending point. For example, the user may input a starting coordinates (50, 150) in a two-dimensional plane. These coordinates may also be three dimensions and may have a time associated with the coordinates to generate controlled, times, movement. The user may move remote assembly system 300 near the actual position of waypoint A. The user may then change modes of aerial device 100 to autonomous mode or semi-autonomous mode and remote assembly 202 may instruct by the stored instructions and cause to move by the instructions based on the state of boom assembly 104 and the location of waypoint B. Remote assembly system 300 may be moved to waypoint B. In some embodiments, waypoint A may be a "home" waypoint where remote assembly system 300 moves if there is any detected malfunctions or loss of communication.

In some embodiments, it may be commanded by the user or by a timer that remote assembly system 300 moves from waypoint A to waypoint B. FIG. 5 describes how the motion of remote assembly system 300 from waypoint A to waypoint B may be accomplished by the boom dynamics; however, the input may be the coordinates of waypoint B, error between the state of the robot and the reference state, or any other control signal rather than the user input. A feedback controller may be utilized to detect the inertial spatial coordinates, and based on the error between the actual position and the commanded position, move remote assembly system 300 according to the above description in reference to FIG. 5. As described above, the inverse kinematics may be utilized to move remote assembly system 300 from waypoint A to waypoint B using feedback reference signal based on the location of waypoint B and from a location sensor of remote assembly system 300. The location sensor may be one or the one or more sensors 220 and may be a short-range transceiver or a global transceiver such as GPS.

In some embodiments, there may be one, two, three, four, or any number of waypoints and algorithms for controlling the motion of manipulators and the boom between non-linear waypoints. Waypoints may be positioned in any arrangement for any manipulators and the boom assembly to move autonomously as desired. For example, waypoints C, D, E, and F are arranged in an exemplary rectangular pattern. Any pattern may be defined by the waypoints including square, triangular, circular, any regular or irregular shape, or any abstract shape. Hard corners may not be desirable as the immediate change in direction can result in unwanted dynamics causing stress and oscillations on the structure. As such, slow changes may be implemented. As shown, the transition between line segments C-D and D-E may be connected by a spline. The spline may be defined based on the angle between the line segments, the manipulator used, and the rate at which the manipulator is moving.

For example, the manipulator may be a high-dexterity manipulators such as robot arms 424, 428. The manipulators may move between the line segments along a relatively short spline compared to a high-capacity manipulator such as heavy utility arm 390 when moving at the same rate. However, heavy utility arm 390 may move more slowly allowing a shorter spline than robotic arms 424, 428. The spline may be controlled by computer-executable instructions provided by the hardware components described herein.

Figure 8:
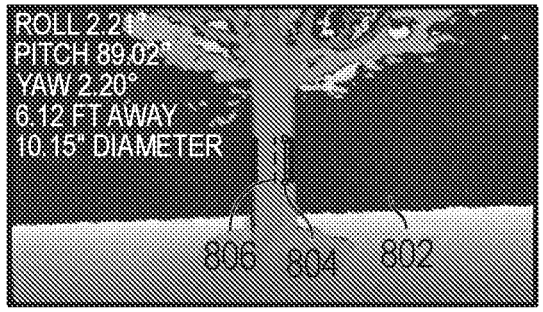
FIG. 8 depicts an embodiment of object detection and alignment.
Figure 8:
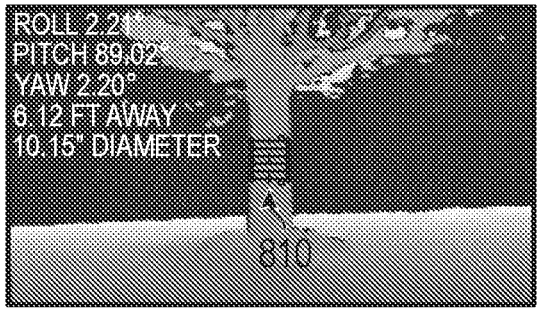
Figure 8:
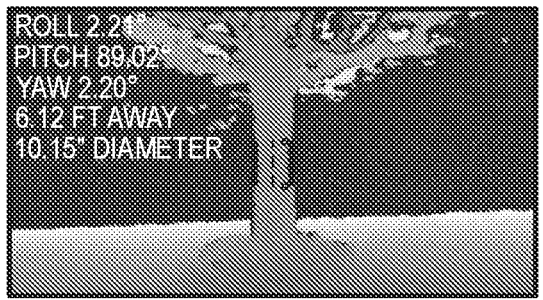
Figure 8:
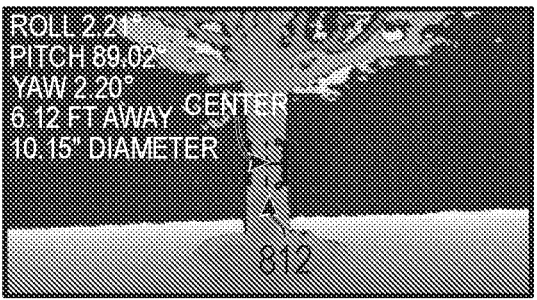
Figure 8:
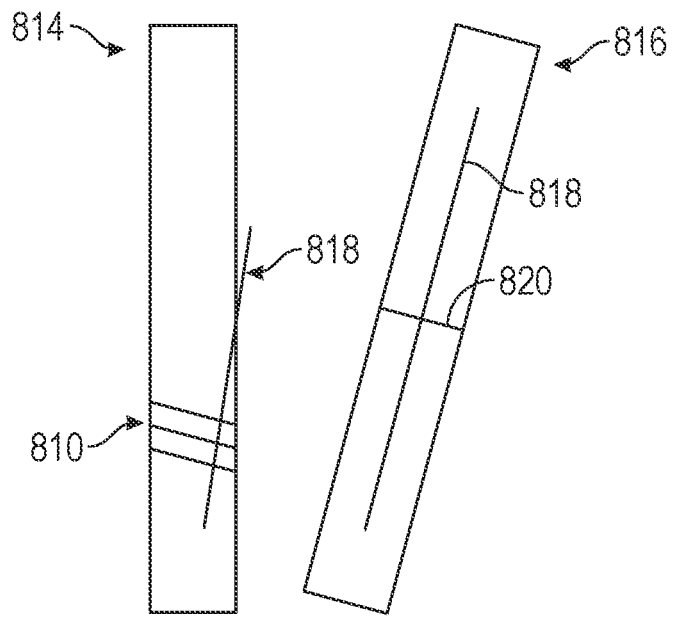

In some embodiments, remote assembly system 300 may detect objects and calculate coordinates thereby generating waypoint B. Remote assembly 202 may detect the operational environment using the sensor 290 as described above. The three-dimensional representation may be generated within the operation environment. A location of waypoint B may be determined based on operation environment 600 and the three-dimensional representation stored. When waypoint B is determined, remote assembly 202 may command the movement of remote assembly system 300 to waypoint B and command the movement of boom assembly 104 as well as any operations of robot unit 302 as described above. Furthermore, in some embodiments, the waypoints may be moved dynamically in near real time by the operator inputs at hand controllers 412, 414. FIG. 8 depicts an embodiment of detecting objects and autonomously or semi-autonomously conducting cutting or moving operations. For example, any of the above-described cameras 434, depth sensor 438, and camera rod camera 464 may be used individually or in combination to obtain images of the object, in this example, a tree trunk. Here, depth sensor 438 may be used in combination with cameras 434 to determine the edges of the tree. The background 802 is shown in darker contrast. The edges of the tree (shown as black points) may be determined from any edge detection, object recognition, or object detection algorithms. Points on each of the opposing edges may be determine and cross lines 810 may be drawn between the points. A vertical centerline through the cross lines 810 may be determined. Finally, a horizontal centerline may be connected between the two edges. A camera reticle 806 may be aligned with the center of the cross lines 810. The cross between the vertical center line and the horizontal centerline may mark the center 812 in which to aim. Because this is a tree and may be recognized as such, or the user may input that the object is a tree, it is known that it is generally round. Therefore, the horizontal centerline may be used as an estimate of the diameter of the tree.

As shown in the final drawing a first object representation 814 is assumed to be vertical but the measured angles do not align. The detected horizontal center line 820 and vertical center line 818 are tilted relative to the first object representation 814. As shown in the images, roll, pitch, and yaw, may be determined to best align with the object. Accordingly, the virtual representation may be a rotated representation 816 to align with the determined measurement lines. Furthermore, the diameter as described above, and the distance to the object may be measure. The distance to the object may be measured by depth sensor 438, which may be a point cloud camera, a laser range finder, or the like. As described below, grappling implements, cutting implements, and the like may be configured to be aligned with objects to be clamped, cut, or any other method of coupling. In some embodiments, this method of detection and alignment may be performed to couple tools with fasteners, utility poles, transformers, grooves, notches, ratchets, sockets, and the like.

Figure 9B:
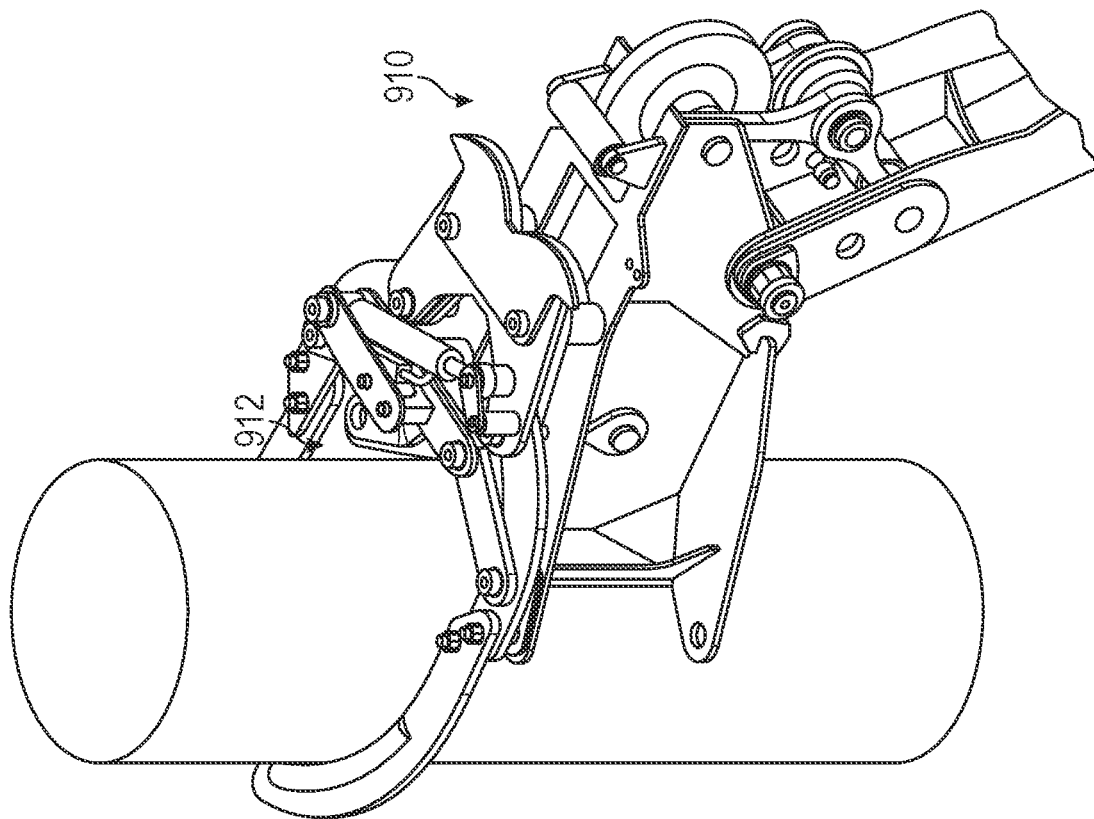
FIGS. 9A and 9B depict grapplers for some embodiments.
Figure 9A:
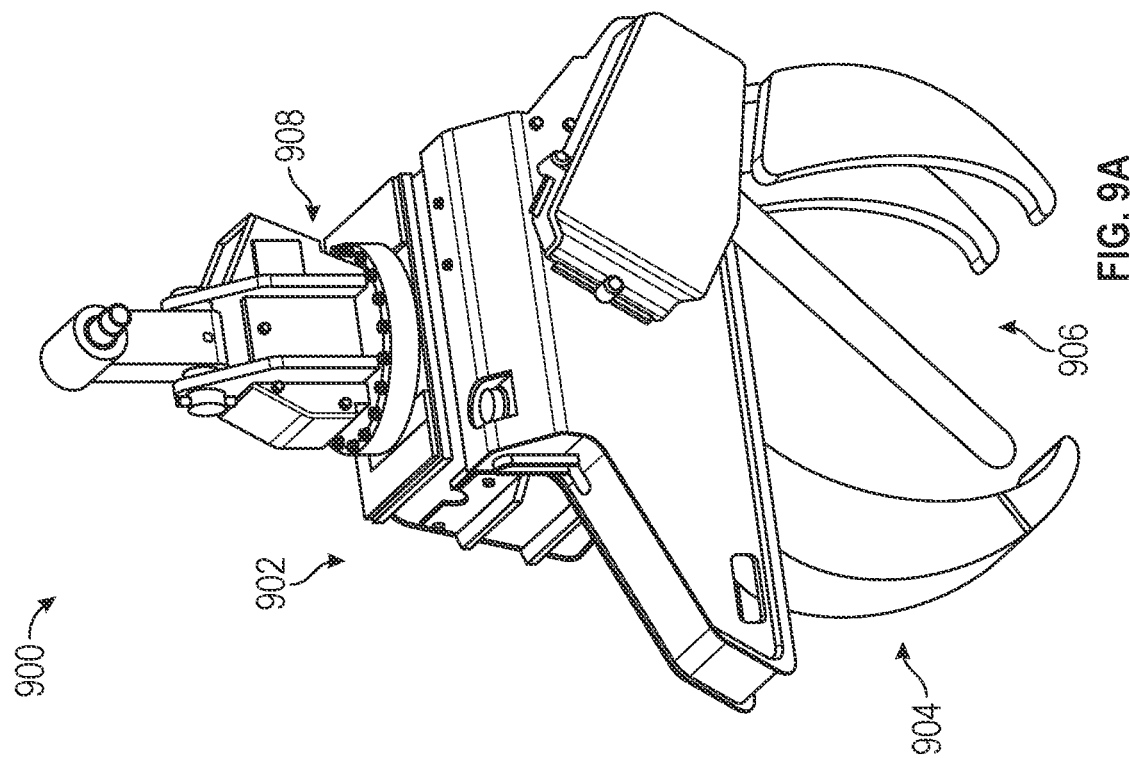

FIGS. 9A and 9B depict exemplary grapples 900. FIG. 9A depicts exemplary tools that may be used for cutting in the above-described example. Grapple 902 may comprise tines 904 and cutting device 906 (e.g., a saw) operable by hydraulics, pneumatics, electricity, or the like. In some embodiments, grapple 902 may comprise at least one joint 908 providing rolling motion or, similarly, may comprise actuation in inertial coordinate system 702 about x, y, and z, providing pitch, roll, and yaw. Accordingly, the grapple 902 may be operable to rotate to a position for optimal cutting based on the object detection described in reference to FIG. 8. Furthermore, as the roll, pitch, yaw, diameter, and distance are known, grapple 902 may be oriented to the object and moved to the object placing the object within tines 904, close to tines 904 to the measured diameter or until a desired pressure is achieved prior to cutting. When the desired pressure is achieved on tines 904, cutting device 906 may be operated to cut the object. The above-described cutting tasks may be performed either fully autonomously or semi-autonomously. In some embodiments, the user may command grapple 902 to perform the task.

Furthermore, FIG. 9B depicts an embodiment of load guide 910 for gripping and guiding a pole into a location to be inserted into the ground. In some embodiments, load guide 910 may comprise mecanum wheels 912 provide translation and simultaneous rotation of the pole. In some embodiments, the pole may be a utility pole and load guide 910 may be position at the end of boom assembly 104. Using the above-described object detection (FIG. 8), load guide 910 may be used in a completely autonomous or semi-autonomous mode. For example, the user may position load guide 910 such that the pole is situated above a pre-dug hole. The user may then initiate automatic installation of the pole into the ground, where boom assembly 104 moves the pole downward into the hole while load guide 910 translates and rotates the pole. In some embodiments, boom assembly 104 may remain stationery and load guide 910 may translate and rotate the pole.

Figure 10:
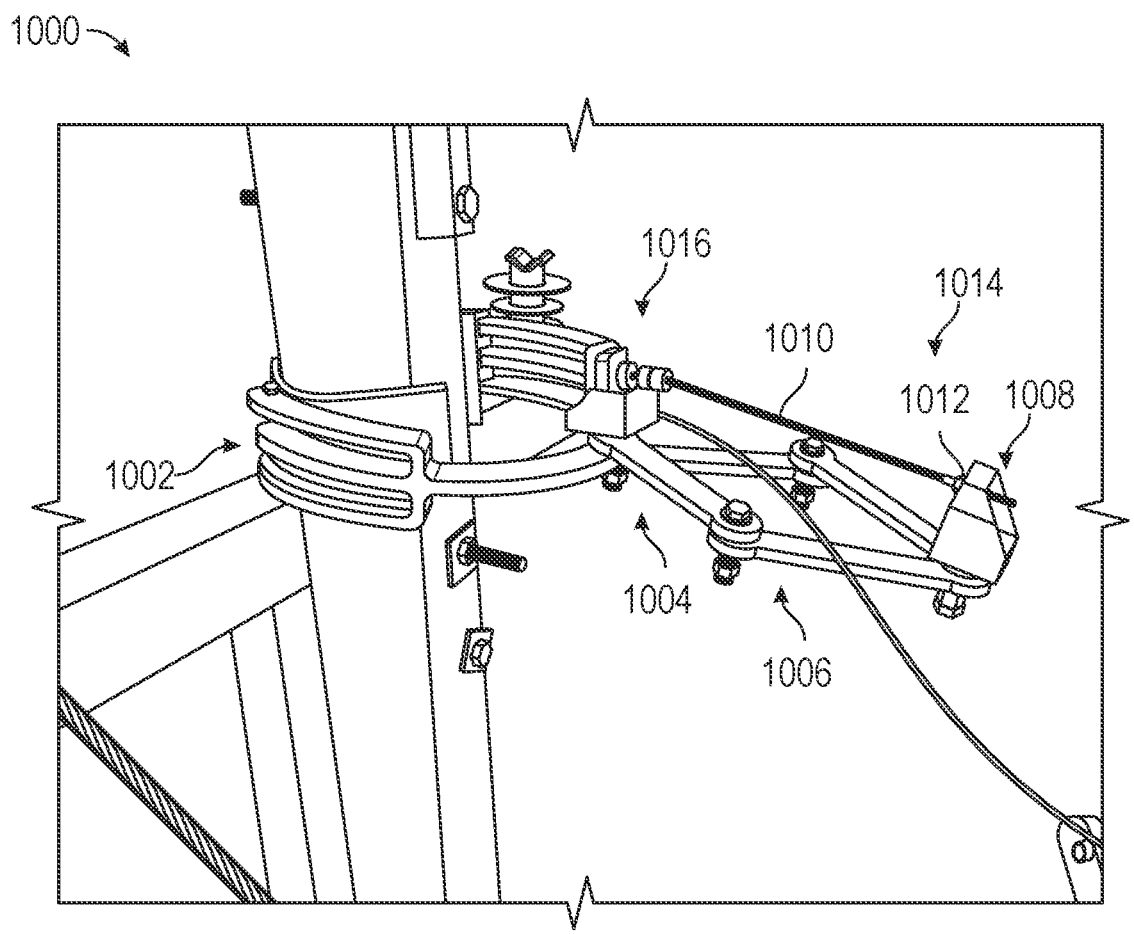
FIG. 10 depicts a clamp that may be used in some embodiments.

FIG. 10 depicts an exemplary clamp 1000 for a utility pole. In some embodiments, clamp 1000 comprises two or more clamp tines 1002 configured to clamp onto the utility pole. Clamp tines 1002 may be connected to first rods 1004 that may be coupled to second rods 1006 that may be coupled to actuator 1008 for rotating threaded rod 1010. When threaded rod 1010 is rotated, or threaded rod 1010 is stationary while threaded bushing 1012 rotates about threaded rod 1010, distal end 1014 of clamp 1000 moves away from proximal end 1016 of the clamp 1000 causing clamp tines 1002 to come together. Similarly, when actuator 1008 rotates the opposite direction, distal end 1014 of the clamp 1000 moves toward proximal end 1016 separating the joints between first rods 1004 and second rods 1006 causing clamp tines 1002 to move away from each other releasing the utility pole. Clamp 1000 may be electrically, mechanically, hydraulically, or pneumatically actuated.

Clamp 1000 may be configured to couple to and support any bracket, three-phase lifter, manipulator arm, or the like. Clamp 1000 may be self-locking such that clamp 1000 may move into position and lock onto a utility pole. Clamp 1000 may be powered by a local power source such as a battery or motor positioned at the boom tip. In some embodiments, the control system may be disposed locally and communicate wirelessly, by wire, by fiber optics, short-range communication, or any other communication method to robot unit 302, heavy utility arm 390, or any other control system. In some embodiments, clamp 1000 may be included in remote assembly system 300.

Figure 11:
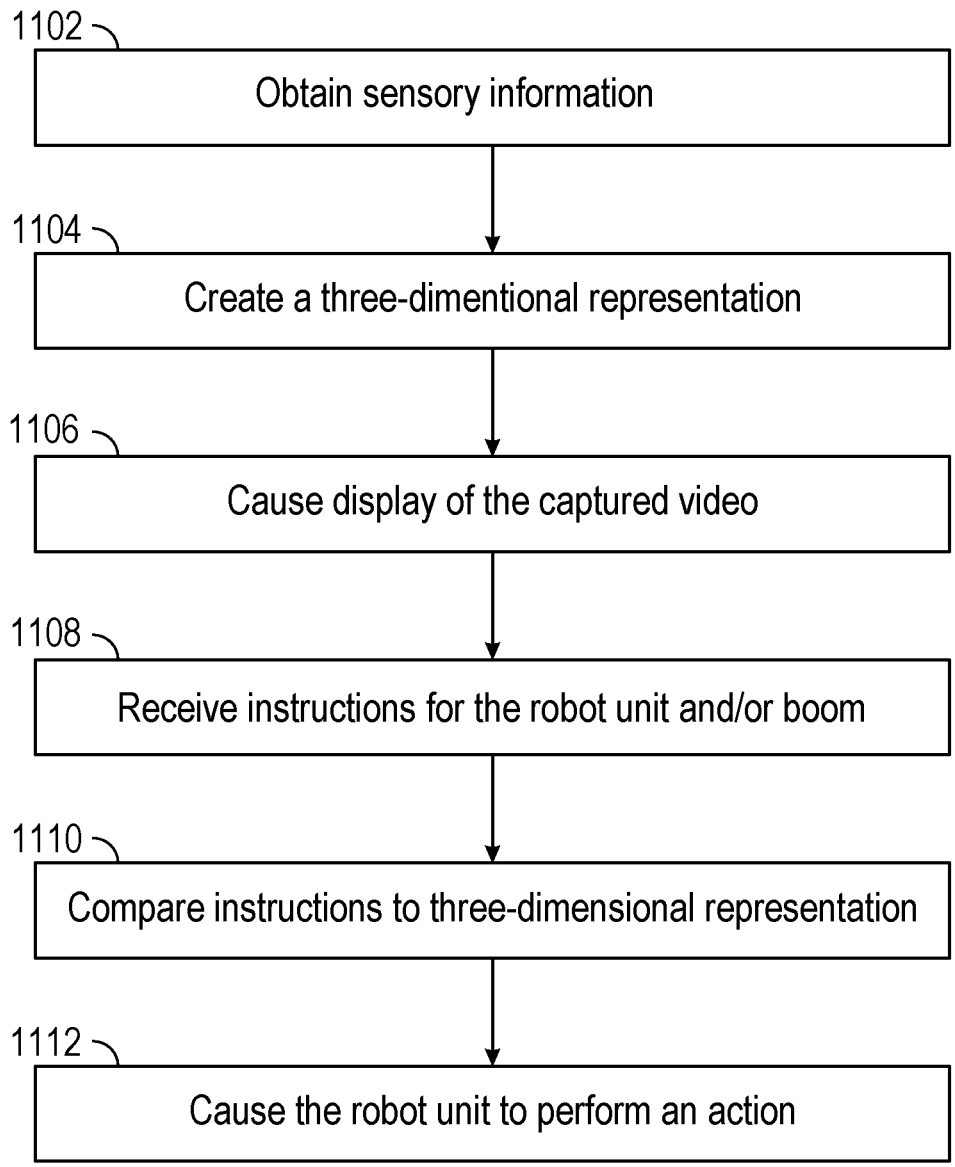
FIG. 11 depicts a process of performing a task autonomously or semi-autonomously.

Referring now to FIG. 11, methods of operating aerial device 100 including remote assembly system 300 including robot unit 302. are described. Methods of operating aerial device 100 or components thereof may include manual, autonomous, or semi-autonomous control methods. A method may include any one or more operations presently disclosed herein. The one or more operations may be performed at least in part by a computing device that includes at least one processor and at least one memory device, which may be one or more non-transitory computer-readable media. A method and/or one or more operations may be embodied by the computer-readable medium. The computer-readable medium may include computer-executable instructions, which when executed by at least one processor, cause the at least one processor to perform one or more operations. The method may include the one or more operations.

At step 1102, remote assembly system 300 may obtain sensory information by at least one sensor 290, cameras 434, depth sensor 438, camera rod camera 464, and any other sensory devices described herein. The sensory information may be indicative of a state of aerial device 100, a state of remote assembly system 300, a state of boom assembly 104, and/or any associated components. Furthermore, the sensory information may be indicative of operational environment 600 and the object and locations of the objects therein. At least one sensor 290 may be any accelerometer, camera, magnetometer, Hall effect sensor, rotary encoder, gyroscope, pose sensor, or the like.

At step 1104, three-dimensional representation may be created as described in embodiments above. The three-dimensional representation may be a representation of operational environment 600. The three-dimensional representation may include inertial coordinate system 702. In some embodiments, At step 1106, the obtained imagery may be displayed to the operator of the aerial device 100 as described in embodiments above. The imagery may be photographs or video and may be displayed to the operator at any location including on site or at a remote location. The operator may decide further steps based on the imagery including obtaining more imagery or continuing with further operations.

At step 1108, instructions for robot unit 302 and/or boom assembly 104 may be received. The instructions may be from the operator or may be from at least one processor executing the computer-executable instructions. The operator may provide complete controls or may simply provide inputs (e.g., labels, mode changes, initiation of modes, and the like). The operator may simply approve a suggested next action presented by remote assembly system 300. In some embodiments, the commands may be generated by receiving a reference signal indicative of a desired state and comparing the desired state to the three-dimensional representation and the current state at step 1110. The comparison the reference signal to the current state of aerial device 100 and the components thereof. The desired state may be generated from the computer-executable instructions based on the operation mode, the tool in use, and any other above-described sensory information.

At step 1112, after comparing the reference signal and the current state, a controller comprising any P, PI, PID, adaptive controller, or any artificial intelligence algorithms may generate signals to control the various actuators of the aerial device 100 and components thereof to complete desired tasks. In some embodiments, the desired tasks may be any of actuating fasteners, securing couplers, lifting and moving objects, and any other task that may be generally performed by a worker in an aerial platform or a cutting device for tree felling, trimming, pruning or the like. In some embodiments, the operational tasks may be movement of the boom assembly 104 to a specified location, operation of a digger derrick or placement of a utility pole.

Figure 12:
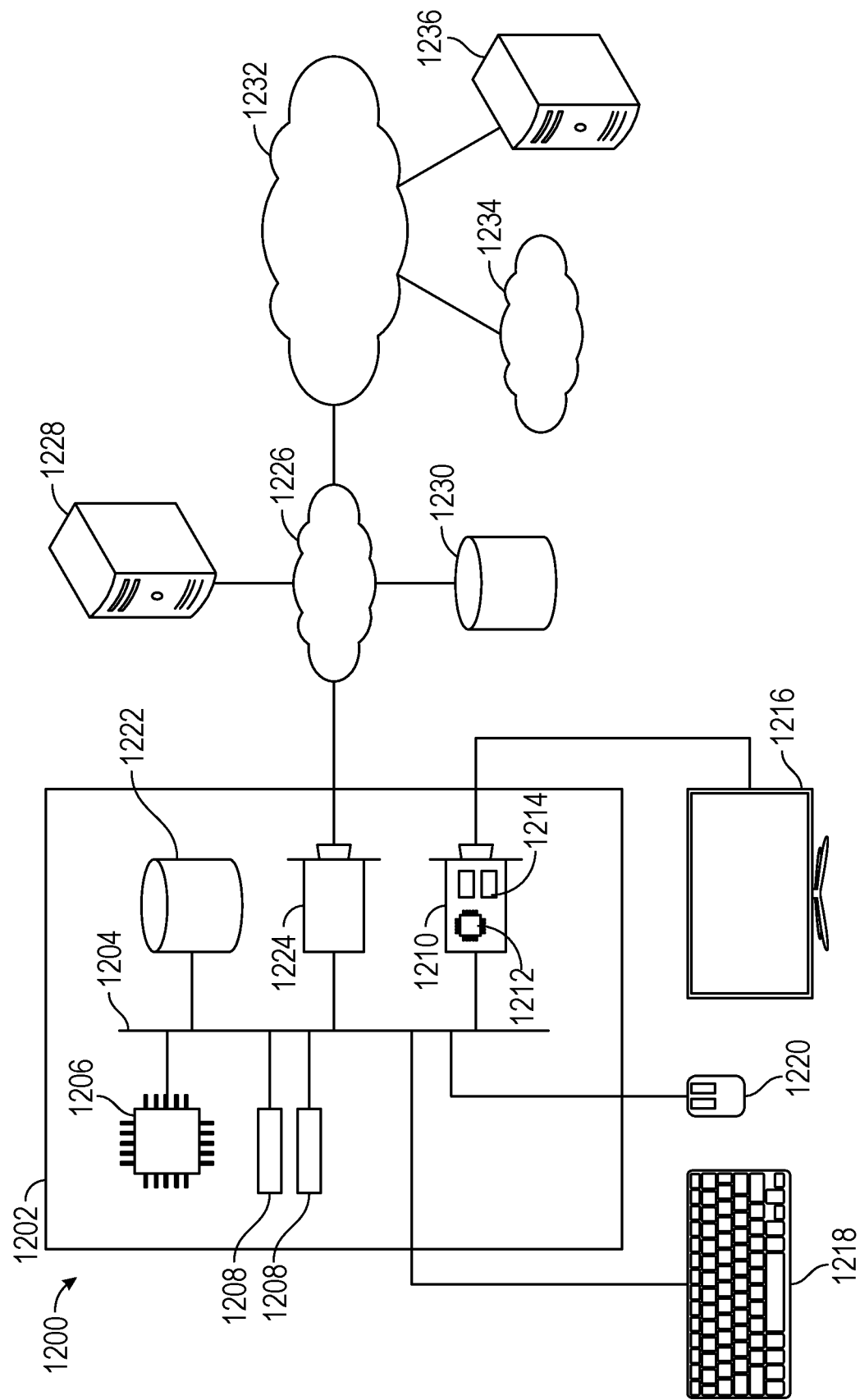
FIG. 12 depicts a hardware platform for some embodiments.

In FIG. 12, an exemplary hardware platform for computer system 1200 for certain embodiments of the invention is depicted. Computer 1202 can be a desktop computer, a laptop computer, a server computer, a mobile device such as a smartphone or tablet, or any other form factor of general- or special-purpose computing device. Depicted with computer 1202 are several components, for illustrative purposes. In some embodiments, certain components may be arranged differently or absent. Additional components may also be present. Included in computer 1202 is system bus 1204, whereby other components of computer 1202 can communicate with each other. In certain embodiments, there may be multiple busses or components may communicate with each other directly. Connected to system bus 1204 is central processing unit (CPU) 1206. Also attached to system bus 1204 are one or more random-access memory (RAM) modules 1208. Also attached to system bus 1204 is graphics card 1210. In some embodiments, graphics card 1210 may not be a physically separate card, but rather may be integrated into the motherboard or the CPU 1206. In some embodiments, graphics card 1210 has a separate graphics-processing unit (GPU) 1212, which can be used for graphics processing or for general purpose computing (GPGPU). Also on graphics card 1210 is GPU memory 1214. Connected (directly or indirectly) to graphics card 1210 is display 1216 for user interaction. In some embodiments, no display is present, while in others it is integrated into computer 1202. Similarly, peripherals such as keyboard 1218 and mouse 1220 are connected to system bus 1204. Like display 1216, these peripherals may be integrated into computer 1202 or absent. Also connected to system bus 1204 is local storage 1222, which may be any form of computer-readable media and may be internally installed in computer 1202 or externally and removably attached.

Computer-readable media include both volatile and non-volatile media, removable and nonremovable media, and contemplate media readable by a database. For example, computer-readable media include (but are not limited to) RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data temporarily or permanently. However, unless explicitly specified otherwise, the term "computer-readable media" should not be construed to include physical, but transitory, forms of signal transmission such as radio broadcasts, electrical signals through a wire, or light pulses through the fiber-optic cable. Examples of stored information include computer-usable instructions, data structures, program modules, and other data representations.

Finally, network interface card (NIC) 1224 is also attached to system bus 1204 and allows computer 1202 to communicate over a network such as local network 1226. NIC 1224 can be any form of network interface known in the art, such as Ethernet, ATM, fiber, Bluetooth, or Wi-Fi (i.e., the IEEE 802.11 family of standards). NIC 1224 connects computer 1202 to local network 1226, which may also include one or more other computers, such as computer 1228, and network storage, such as data store 1230. Generally, a data store such as data store 1230 may be any repository from which information can be stored and retrieved as needed. Examples of data stores include relational or object-oriented databases, spreadsheets, file systems, flat files, directory services such as LDAP and Active Directory, or email storage systems. A data store may be accessible via a complex API (such as, for example, Structured Query Language), a simple API providing only read, write and seek operations, or any level of complexity in between. Some data stores may additionally provide management functions for data sets stored therein such as backup or versioning. Data stores can be local to a single computer such as computer 1228, accessible on a local network such as local network 1226, or remotely accessible over Internet 1232. Local network 1226 is in turn connected to Internet 1232, which connects many networks such as local network 1226, remote network 1234 or directly attached computers such as computer 1236. In some embodiments, computer 1202 can itself be directly connected to Internet 1232. It should be understood that, in some embodiments, computer 1202 may be the controller 224 described in reference to FIG. 2 and may perform similar operations.

The following U.S. patent applications, each filed Jul. 28, 2022, are each hereby incorporated by reference in their entirety as if set forth herein verbatim: U.S. Application Ser. No. 63/392,927, titled "REDUCING LATENCY IN HEAD-MOUNTED DISPLAY FOR THE REMOTE OPERATION OF MACHINERY"; U.S. application Ser. No. 17/875,674, titled "MANUAL OPERATION OF A REMOTE ROBOT ASSEMBLY"; U.S. application Ser. No. 17/875,743, titled "COOPERATIVE HIGH-CAPACITY AND HIGH-DEXTERITY MANIPULATORS"; U.S. application Ser. No. 17/875,796, titled "ROTARY TOOL FOR REMOTE POWER LINE OPERATIONS"; U.S. application Ser. No. 17/875,821, titled "OPERATION AND INSULATION TECHNIQUES"; U.S. application Ser. No. 17/875,893, titled "COORDINATE MAPPING FOR MOTION CONTROL"; U.S. application Ser. No. 17/875,943, titled "WIRE TENSIONING SYSTEM"; U.S. application Ser. No. 17/875,990, titled "CROSS-ARM PHASE-LIFTER"; and U.S. Application Ser. No. 63/393,047, titled "ELECTRICALLY INSULATING BLANKET WITH MEMORY SET". The subject matter described in the foregoing U.S. patent applications may be combined with the subject matter of the present disclosure. For example, one or more embodiments, features, structures, acts, etc. described in any one or more of the foregoing U.S. patent applications may be combined with one or more embodiments, features, structures, acts, etc. described in the present disclosure.

Although the presently disclosed subject matter has been described with reference to the embodiments illustrated in the attached drawing FIGURES, it is noted that equivalents may be utilized, and substitutions made herein without departing from the scope of the invention defined by the appended claims.

Accordingly, what is claimed as new and desired to be protected by Letters Patent includes the following:

1. A robot system for performing cooperative tasks in an operational environment of an aerial device, the robot system comprising:
at least one processor;
a robot unit disposed at a boom tip comprising at least one manipulator configured to perform a task in the operational environment;
a tool configured to attach to the at least one manipulator and perform the task;
a camera for obtaining images of the operational environment;
a sensor associated with the robot unit;
a head-up display configured to display a user interface;
an input device associated with a user and communicatively coupled to the robot unit; and
one or more non-transitory computer-readable media storing computer-readable instructions that, when executed by the at least one processor, perform a method comprising:
obtaining, by the camera, data indicative of a location of an object in the operational environment;
obtaining sensor data from the sensor,
autonomously performing the task using the tool and based at least in part on the sensor data and the data indicative of the location of the object;
displaying, by the head-up display, an indicia at a task location for performing the task and further displaying option labels for an identification of a component;
receiving input from the user by the input device,
wherein the input is either one of a designation of the task location for performing the task or the identification of the component in the operational environment;
updating the task based on the input from the user; and
performing the updated task based at least in part on the sensor data and the input from the user.

2. The robot system of claim 1, wherein the input device is a feature of a virtual reality (VR) system, the VR system comprising:
a head-mounted display communicatively coupled to the camera and providing the images to the user;
a hand controller providing control of the robot unit to the user; and
the input device for receiving the input from the user.

3. The robot system of claim 1, wherein the input is a first input, the input device is a first input device, and the user is a first user, and wherein the method further comprises:
receiving a second input from a second user by a second input device,
wherein the second input overrides the first input.

4. The robot system of claim 3, wherein the second user observes the robot unit performing the task from an observation location providing visibility to the robot unit.

5. The robot system of claim 1, wherein the robot unit is a jib and winch, and the task is hooking the winch to the object and lifting the object.

6. The robot system of claim 1, wherein the tool is a typical lineman tool, and the method further comprises automatically performing the task based on the typical lineman tool.

7. A robot system for performing cooperative tasks in an operational environment of an aerial device, the robot system comprising:
at least one processor;
a robot unit disposed at a boom tip comprising at least one manipulator configured to perform a task in the operational environment;
a tool configured to attach to the at least one manipulator and perform the task;
a camera for obtaining images of the operational environment;
a sensor associated with the robot unit;
an input device associated with a user and communicatively coupled to the robot unit;
a head-mounted display communicatively coupled to the camera and configured to display the images of the operational environment to the user; and one or more non-transitory computer-readable media storing computer-readable instructions that, when executed by the at least one processor, perform a method comprising:
- obtaining sensor data from the sensor;
- autonomously performing the task using the tool and based at least in part on the sensor data;
- displaying, by the head-mounted display, the images of the operational environment, the sensor data overlaid on the images of the operational environment, and input options for commanding the robot unit;
- receiving input from the user by the input device selecting at least one of the input options;
- updating the task based on the input from the user;
- performing the updated task based at least in part on the sensor data and the input from the user.

8. The robot system of claim 7, further comprising a lower boom and an upper boom; and the method further comprises:
- controlling a robot location of the robot unit by controlling a first velocity of the lower boom and a second velocity of the upper boom.

9. The robot system of claim 8, wherein the method further comprises controlling the lower boom and the upper boom based on visual data obtained from the camera.

10. The robot system of claim 9, wherein the method further comprises:
- receiving a location of operation from the user by the input device; and
- autonomously controlling the upper boom and the lower boom until the boom tip is at the location of the operation,
- wherein the upper boom telescopically extends from the lower boom.

11. The robot system of claim 7, wherein the method further comprises:
- automatically detecting an object location of an object;
- automatically classifying the object; and
- selecting the tool based on the classifying of the object.

12. One or more non-transitory computer-readable media storing computer-readable instructions that, when executed by at least one processor, perform a method of performing cooperative tasks in an operational environment of an aerial device, the method comprising:
- obtaining sensor data from a sensor associated with the aerial device;
- obtaining images of the operational environment by a camera disposed on the aerial device;
- providing a robot unit comprising a tool for performing a task;
- automatically detecting an object location of an object;
- automatically classifying the object;
- selecting the tool based on the classifying of the object;
- autonomously performing the task using the tool based at least in part on the sensor data and the images of the operational environment;
- displaying, by a display, the images of the operational environment;
- receiving input from a user by an input device;
- updating the task based on the input from the user; and
- performing the updated task based at least in part on the sensor data, the images, and the input from the user.

13. The method of claim 12, wherein the task is manipulating one of a tie wire, a bolt, a nut, a capacitor, or a transformer.

14. The method of claim 12, further comprising applying inverse kinematics to move the robot unit to autonomously perform the task.

15. The method of claim 12, wherein the input device is associated with a virtual reality (VR) system comprising the display and the input device, wherein the method further comprises:
- providing the images to the user by the display, wherein the display is a head-mounted display; and
- providing full control of the robot unit by the input device.

16. The method of claim 12, wherein the input is a first input, the user is a first user, and the input device is a first input device, and the method further comprises:
- receiving a second input from a second user by a second input device,
- wherein the second input overrides the first input.

17. The method of claim 12, further comprising:
- wherein the tool is a socket, and the method further comprises:
- automatically locating a bolt; and
- automatically controlling the socket to actuate the bolt.

18. The robot system of claim 1,
- further comprising a lower boom and an upper boom; and
- wherein the method further comprises controlling a robot location of the robot unit by controlling a first velocity of the lower boom and a second velocity of the upper boom.

19. The robot system of claim 18, wherein the method further comprises applying inverse kinematics to move the robot unit to autonomously perform the task.

20. The robot system of claim 18, wherein the method further comprises applying inverse kinematics to move the lower boom and the upper boom.

* * * * *